United States Patent
Das Gupta et al.

(10) Patent No.: US 8,285,033 B2
(45) Date of Patent: Oct. 9, 2012

(54) BI-AFFINITY FILTER: A BILATERAL TYPE FILTER FOR COLOR IMAGES

(75) Inventors: Mithun Das Gupta, Cupertino, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 397 days.

(21) Appl. No.: 12/752,615

(22) Filed: Apr. 1, 2010

(65) Prior Publication Data

US 2011/0243428 A1  Oct. 6, 2011

(51) Int. Cl.
*G06K 9/00* (2006.01)
*H04N 3/14* (2006.01)

(52) U.S. Cl. ......................... 382/162; 348/272

(58) Field of Classification Search .................. 382/162, 382/163, 164, 165, 166, 167, 260, 261, 262, 382/263, 264, 274, 275; 348/263, 270, 271, 348/273, 280; 523/160, 161, 400
See application file for complete search history.

(56) References Cited

U.S. PATENT DOCUMENTS

| 6,816,197 | B2 * | 11/2004 | Keshet et al. | 348/273 |
| 7,146,059 | B1 * | 12/2006 | Durand et al. | 382/260 |
| 7,352,911 | B2 * | 4/2008 | Maurer | 382/260 |
| 7,522,782 | B2 | 4/2009 | Lim et al. | |
| 7,657,118 | B2 * | 2/2010 | Aufranc et al. | 382/276 |

OTHER PUBLICATIONS

Levin, A. et al., "A Closed Form Solution to Natural Image Matting", IEEE Transactions on Pattern Analysis and Machine Intelligence, vol. 30, No. 2, Feb. 2008.

Liu, C., et al., "Automatic Estimation and Removal of Noise from a Single Image", PAMI, 30(2):299-314, 2008.
Tomasi, C., et al., "Bilateral Filtering for Gray and Color Images", In ICCV '98: Proceedings of the Sixth International Conference on Computer Vision, 1998.
Omer, I., et al., "Color Lines: Image Specific Color Representation", 2004 IEEE Computer Society Conference on Computer Vision and Pattern Recognition (CVPR'04).
Porikli, Fatih, "Constant Time o(1) Bilateral Filtering", IEEE Conference on Computer Vision and Pattern Recognition (CVPR) 2008.
Lu, W.S., et al., "Design of Two-Dimensional Digital Filters Using Singular-Value Decomposition and Balanced Approximation Method", IEEE Transactions on signal Processing, vol. 39, No. 10, pp. 2253-2262, Oct. 1991.
Wells, W., III, "Efficient Synthesis of Gaussian Filters by Cascaded Uniform Filters", IEEE Transactions on Pattern Analysis and Machine Intelligence, vol. PAMI-8, No. 2, pp. 234-239, Mar. 1986.
Bando, Y., et al., "Extracting Depth and Matte using a Color-Filtered Aperture" ACM Transactions on Graphics, vol. 27, No. 5, Article 134, Dec. 2008.

(Continued)

*Primary Examiner* — Abolfazl Tabatabai

(57) ABSTRACT

An edge preserving filter that works on the principle of matting affinity allows a better representation of the range filter term in bilateral class filters. The definition of the affinity term can be relaxed to suit different applications. An approximate bi-affinity filter whose output is shown to be very similar to the traditional bilateral filter is defined. The present technique has the added advantage that no color space changes are required and hence an input image can be handled in its original color space. This is a big benefit over the traditional bilateral filter, which needs conversion to perception based spaces, such as CIELAB, to generate results close to the present invention. The full bi-affinity filter preserves very minute details of the input image, and thus permits an enhanced zooming functionality.

24 Claims, 16 Drawing Sheets

OTHER PUBLICATIONS

Geusebroek, Jan-Mark, et al., "Fast Anisotropic Gauss Filtering", IEEE Transactions on Image Processing, vol. 12, No. 8, Aug. 2003.

Paris, S., et al., "A Fast Approximation of the Bilateral Filter using a Signal Processing Approach", European Conference on Computer Vision (ECCV), 2006.

Weiss, B., "Fast Median and Bilateral Filtering", ACM Trans. Graph, 25(3): pp. 519-526, 2006.

Joshi, N., et al., "Image Deblurring and Denoising using Color Priors", CVPR 2009.

Irani, M., et al., "Motion Analysis for Image Enhancement: Resolution, Occlusion, and Transparency", JVCIP, 1993.

Yang, Q., et al., "Real-time o(1) Bilateral Filtering", IEEE Conference on Computer Vision and Pattern Recognition (CVPR), 2009.

Bennett, Eric P., et al., "Video and Image Bayesian Demosaicing with a Two Color Image Prior", ECCV 2006, Part I, LNCS 3951, pp. 508-521, 2006.

Huang, T.S., "Two-Dimensional Digital Signal Processing II", Springer-Verlag, Berlin, pp. 209-211, 1981.

* cited by examiner

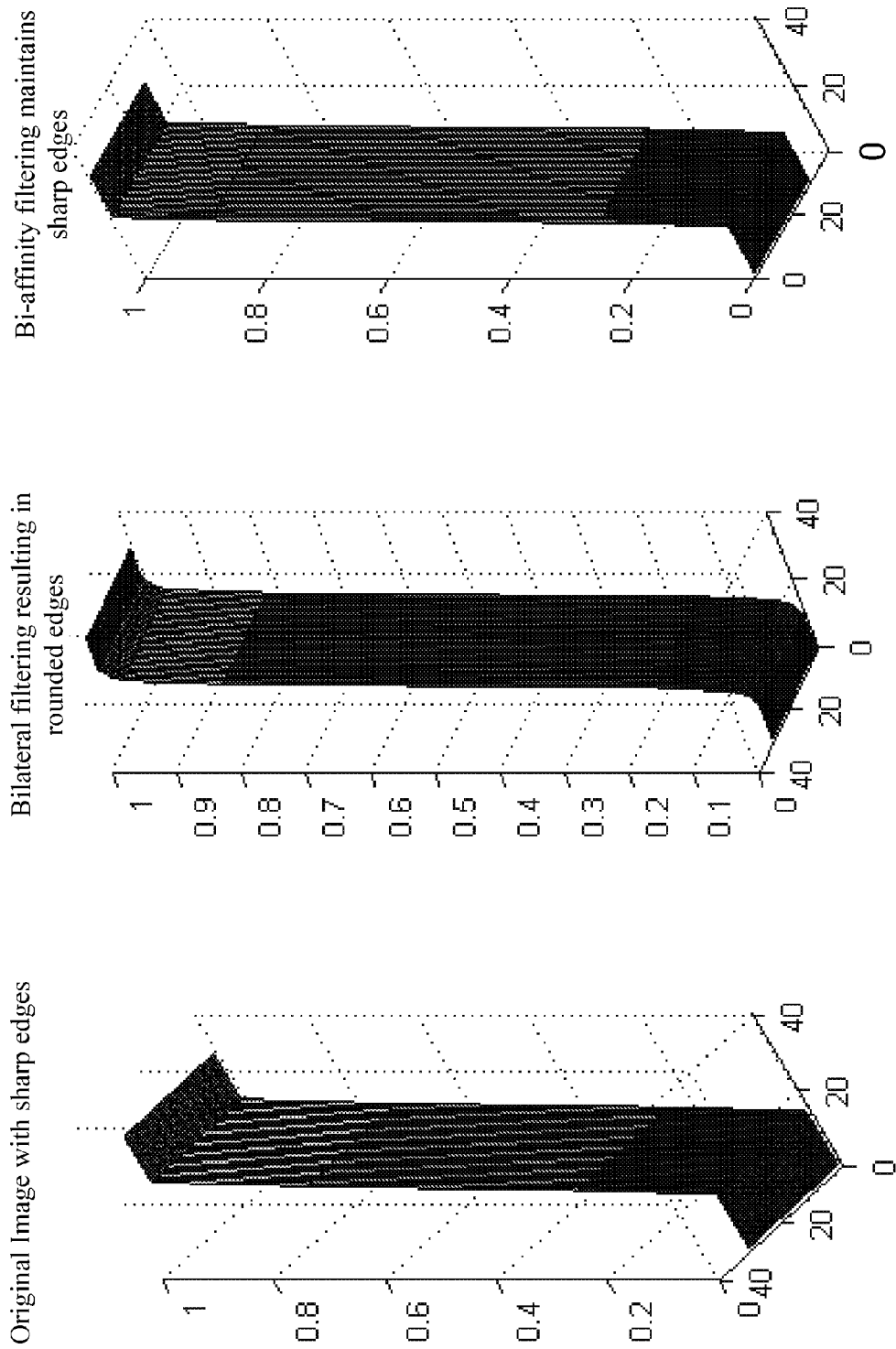

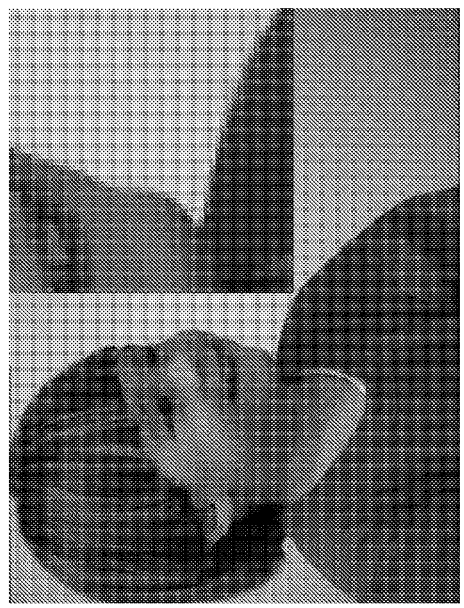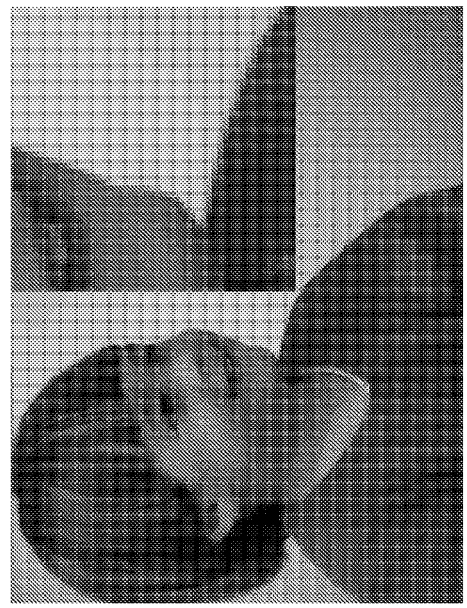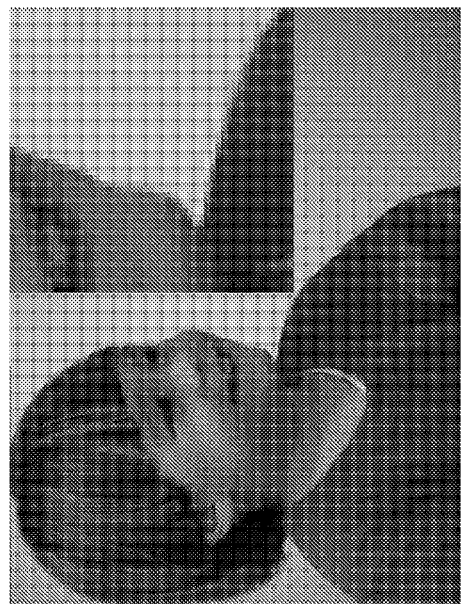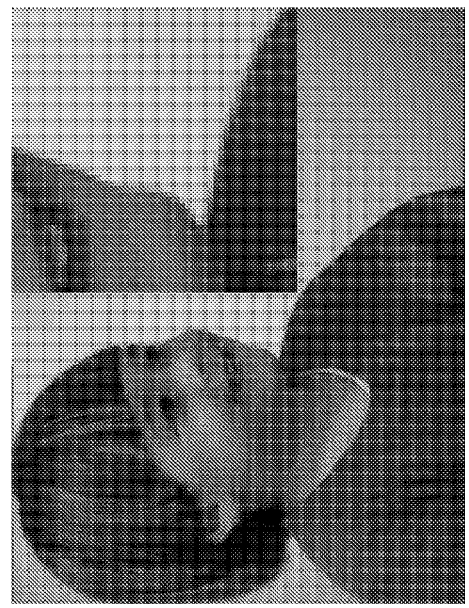
FIG. 6

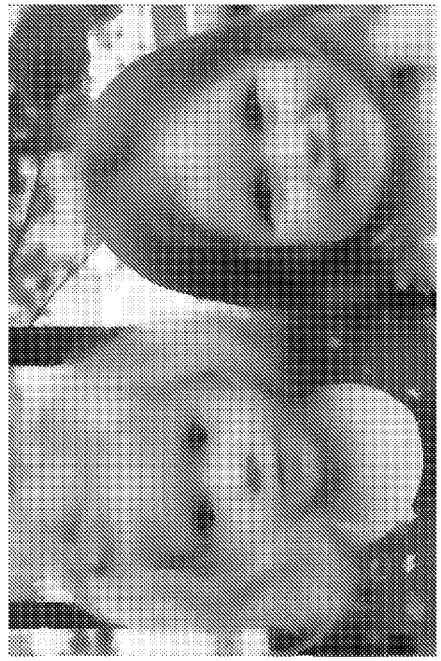
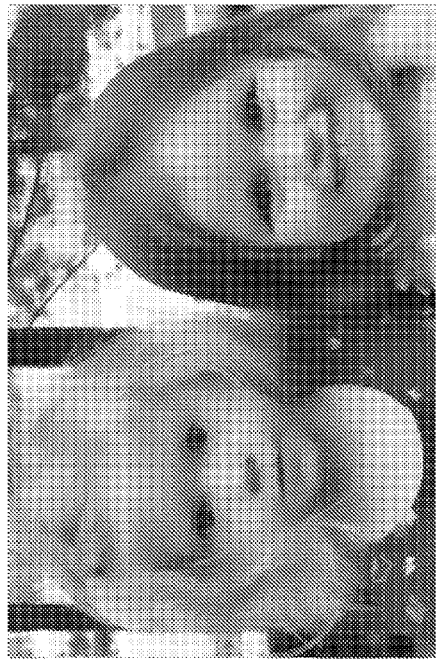
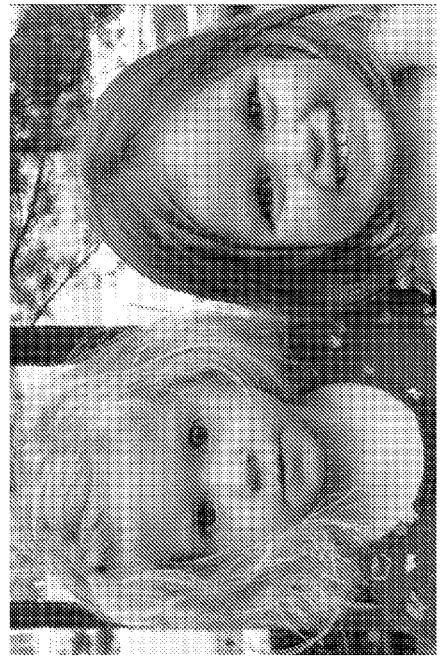
Bilateral filter in native RGB color space
Approximate Bi-affinity filter in native RGB color space with: $\varepsilon = 0.1$
Original Image
Bilateral filter after conversion to CIELAB color space with: $w = 11$; $\sigma_d = 5$, $\sigma_r = 0.1$
FIG. 8

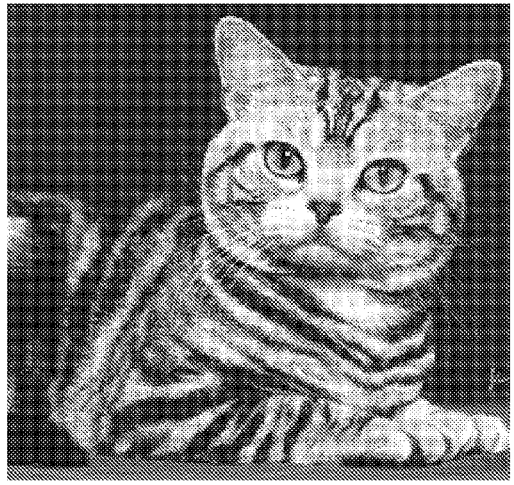
Original Image
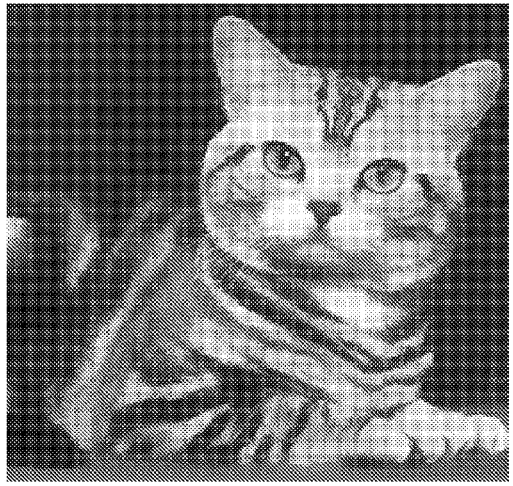
Bilateral filter in native RGB color space
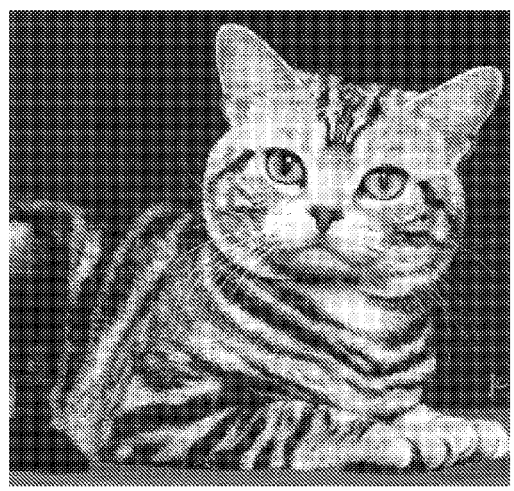
Bilateral filter after conversion to CIELAB color space with: $w = 11$; $\sigma_d = 5$, $\sigma_r = 0.1$
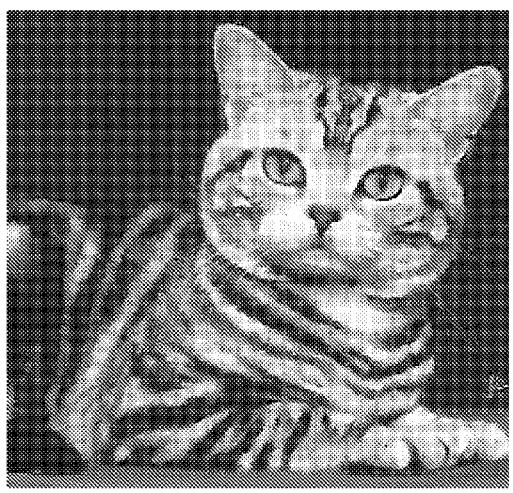
Approximate Bi-affinity filter in native RGB color space with: $\varepsilon = 0.1$
FIG. 9

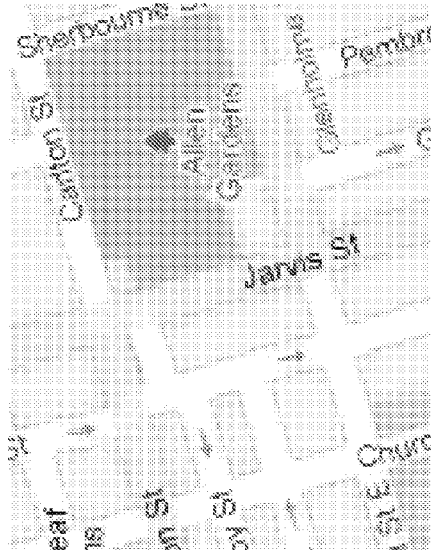
Original Image
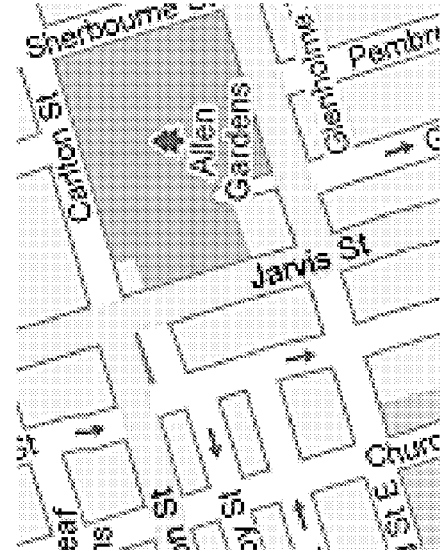
Bilateral filter in native RGB color space
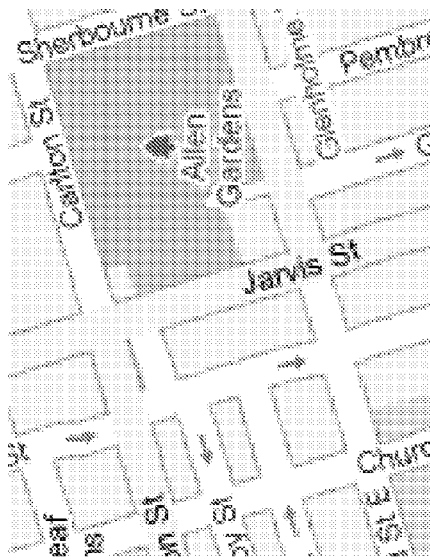
Bilateral filter after conversion to CIELAB color space with: $w = 11$; $\sigma_d = 5$, $\sigma_r = 0.1$
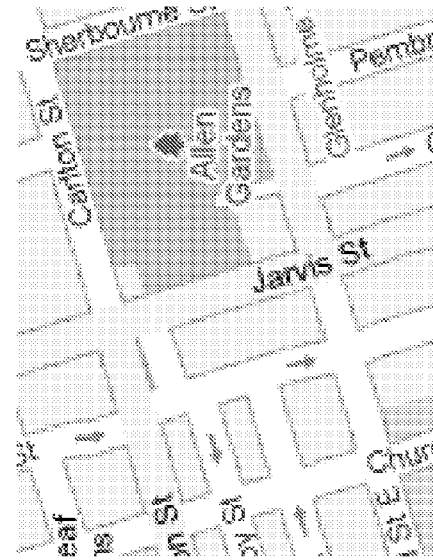
Approximate Bi-affinity filter in native RGB color space with: $\varepsilon = 0.1$
FIG. 10

Input image enlarged by a factor of 2
(by bicubic interpolation)

Enhanced final image

Mean affinity map for all pixels

Image Zoomed in by a factor 2x by bi-cubic interpolation

Image Enhancement by Bi-affinity filter. Note the preservation of small image details Image Enhancement by Bi-affinity filter. Note the preservation of small image details Image Zoomed in by a factor 2x by bi-cubic interpolation Image Enhancement by Bi-affinity filter. Note the preservation of small image details Image Zoomed in by a factor 2x by bi-cubic interpolation

BI-AFFINITY FILTER: A BILATERAL TYPE FILTER FOR COLOR IMAGES

BACKGROUND

1. Field of Invention

The present invention pertains to the field of image processing. More specifically, it pertains to the field of image smoothing by bilateral filtering.

2. Description of Related Art

The bilateral filter was originally proposed by Tomasi and Manduchi in *Bilateral Filtering for Gray and Color Images*, ICCV: Proceedings of the Sixth International Conference on Computer Vision, page 839, 1998, IEEE Computer Society, herein incorporated in its entirety by reference. Basically, the bilateral filter smooths an image while preserving edges by means of a nonlinear combination of nearby image values. The principle idea behind such a filtering operation is to combine information from the spatial domain as well as from a feature domain. It can be represented as $$h(x) = \frac{1}{k(x)} \sum_{y \in \Omega_x} f_s(x, y) g_r(I(x), I(y)) I(y) \quad (1)$$

where I and h are the input and output images respectively, x and y are pixel locations over an image grid, $\Omega_x$ is the neighborhood induced around the central pixel x, $f_s(x,y)$ measures the spatial affinity between pixels at x and y (i.e. the spatial domain, and may be thought of as a spatial filter) and $g_r(I(x), I(y))$ denotes the feature/measurement/photometric affinity (i.e. the feature domain, and may be thought of as a range filter). Parameter k(x) is the normalization term given by $$k(x) = \sum_{y \in \Omega_x} f_s(x, y) g_r(I(x), I(y)) \quad (2)$$

The spatial and range filters (f and g, respectively), are commonly set to be Gaussian filters, as follows:

$$f_s(x, y) = \exp\left(\frac{-\|x - y\|_2^2}{2\sigma_s^2}\right) \quad (3)$$

$$g_r(u, v) = \exp\left(\frac{-\|u - v\|_2^2}{2\sigma_r^2}\right) \quad (4)$$

parameterized by the variances $\sigma_s$ and $\sigma_r$. The range filter, g, penalizes distance in the feature space and hence the filter has an inherent edge preserving property. Due to this property, the bilateral filter, as an edge-preserving filter, has been one of the most widely used filtering techniques within computer vision community.

The bilateral filter is a non-linear filter (making it a computationally intensive operation) and, as such, many researchers have proposed techniques to decompose the non-linear, bilateral filter into a sum of separate one-dimensional filters or similar cascaded representations. Singular value decomposition of the 2D kernel is one such technique. Another proposed technique is an approximation of the bilateral filter by filtering sub-sampled copies of an image with discrete intensity kernels, and recombining the results using linear interpolation.

Recently the run-time of the bilateral filter has been identified as a critical bottleneck, and a few techniques have been proposed that render the filtering operation at an almost constant time, albeit with larger space requirements and behavioral approximations.

The research into improving the performance of the bilateral filter heavily relies on the form of the filter, which is applied in a range domain as well as the spatial domain. One method can be entirely broken down to an approximation of a product of a box filter for smoothing and a polynomial or fourth order Taylor series approximation of a Gaussian kernel. However, when the form of the filter is changed, such methods cannot be applied for the promised increased in speed.

It is an object of the present invention to provide a filter that provides similar image smoothing and edge preserving properties as a bilateral filter, but which is less constrained by nonlinear combination of image values.

It is a further object to provide of the present invention to provide a filter that provides similar image smoothing and edge preserving properties as a bilateral filter, but which lends itself to increased implementation optimizations.

It is a further object of the present invention to provide a filter that not only provides similar image smoothing and edge preserving properties as a bilateral filter, but also provides additional image optimization properties.

SUMMARY OF INVENTION

The above objects are met in method of smoothing and enhancing an input image by using color line techniques to determine the color affinity of pixels within their native color space.

More specifically, the above objects are met in a method of processing a digital input image, comprising: providing the digital input image, I, in physical memory, the input image having color information in a native color space for each image pixel; providing a processing device coupled to the physical memory to access the input image I and create an output image, h, by implementing the following steps:

(a) applying the following sequence to the input image I, $$h_{\sigma, \varepsilon}(x) = \frac{\sum_{y \in \Omega_x} (f_s^\sigma(x, y) L_{xy}^\varepsilon I(y))}{\sum_{y \in \Omega_x} (f_s^\sigma(x, y) L_{xy}^\varepsilon)}$$

where x and y are pixel locations over an image grid, and $\Omega_x$ (or equivalently window w) is the neighborhood induced around the central pixel x; $f_s(x,y)$ measures the spatial affinity between pixels at x and y; parameter σ controls an amount of spatial blurring; $L_{xy}^\varepsilon$ is a laplacian matrix that provides positive color affinity value for two examined pixels, x and y, that have the same color and provides a zero color affinity value for pixels with different color; parameter ε is a regularization term whose relative weight determines the smoothness of output image h.

In this method, step (a) is applied to the input image I in its native color space, which is preferably the RGB color space.

The laplacian matrix $L_{xy}^\varepsilon$ follows a 2 color model specifying that pixel color $I_i$ in an input image I can be represented as a linear combination of two colors P and S as follows: $I_i = \alpha_i P + (1-\alpha_i) S$, $\forall i \in w$, $0 \leq \alpha_i \leq 1$, where the two colors are piecewise smooth and can be derived from local properties within neighborhood $\Omega_x$ containing the pixel i, and wherein piecewise smooth means smooth over a small region, i.e. a region similar in size as window w. It is noted that parameter $\epsilon$ determines the smoothness of the decomposition into the two color modes as represented by the smoothness of $\alpha$ estimates. In this approach, $\alpha_i$ is defined as:

$$\alpha_i = \sum_c a^c I_i^c + b, \forall i \in w, c \in \{1, 2, 3\}$$

where a are weights for each color channel, which is constant for the window w, b is a model parameter, and c is an index that is unique for each window over the color channels. Preferably, the $\alpha$ values are determined according to quadratic cost function $J(\alpha) = \alpha^T L \alpha$.

In this case, the laplacian matrix L is an n×n matrix, where n is the total number of pixels in input image I whose $(ij)^{th}$ element is given by $$\sum_{k|(i,j)\in w_k} \left( \delta_{ij} - \frac{1}{|w_k|}\left(1 + (I_i - \mu_k)\left(\sigma_k + \frac{\varepsilon}{|w_k|}I_3\right)^{-1}(I_j - \mu_k)\right) \right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3.

The laplacian matrix L may be further decomposed into a diagonal matrix D and a weight matrix W with the formulation L=D−W, wherein: diagonal matrix D is defined with terms $D_{ii} = \#[k|i \in w_k]$ at its diagonal and represents the cardinality of the number of windows of which the pixel i is a member; individual terms of weight matrix W are given by $$W_{ij} = \sum_{k|(i,j)\in w_k} \frac{1}{|w_k|}\left(1 + (I_i - \mu_k)\left(\sigma_k + \frac{\varepsilon}{|w_k|}I_3\right)^{-1}(I_j - \mu_k)\right)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3; and color affinity $W_{ij}$ for two pixels with the same color is a positive quantity varying with the homogeneity of the local windows containing the pixels i and j, and color affinity for pixels with different color is zero.

Additionally at the local minima, the solution $\alpha^*$ satisfies a first order optimality condition $L^T \alpha^* = 0$, and the optimal condition is defined as $L^T \alpha^* = (D-W)^T \alpha^*$.

The terms of $W_{ij}$ may be evaluated by counting the contribution of only the center pixel's local window defined as the window centered about it. Preferably, the local window w is a 3×3 pixel window requiring $O(w^2)$ computations.

In another embodiment of the present invention, the method further includes steps of: (b) interpolating the input image I to a resolution higher than its native resolution; and (c) combining the results of step (a) with the interpolated, higher resolution image of step (b). In this approach, step (a) generates detail line information of the input image I, and step (c) adds this line information to the interpolated, higher resolution image.

In the above examples, the laplacian matrix L acts like a zero-sum filter kernel.

The present invention may further be applied to a method for enlarging an input image I. This method preferably includes: providing the digital input image, I, in physical memory, the input image having color information in a native color space for each image pixel; providing a processing device coupled to the physical memory to access the input image I and create an output image, h, by implementing the following steps: (a) applying the following sequence to the input image I, $$h_{\sigma,\varepsilon}(x) = \frac{\sum_{y \in \Omega_x} (f_s^\sigma(x,y) L_{xy}^\varepsilon I(y))}{\sum_{y \in \Omega_x} (f_s^\sigma(x,y) L_{xy}^\varepsilon)}$$

where: (i) x and y are pixel locations over an image grid; (ii) $\Omega_x$ is the neighborhood induced around the central pixel x; (iii) $f_s(x,y)$ measures the spatial affinity between pixels at x and y; (iv) parameter $\sigma$ controls an amount of spatial blurring; (v) $L_{xy}^\varepsilon$ is a laplacian matrix that provides positive color affinity value for two examined pixels, x and y, that have the same color and provides a zero color affinity value for pixels with different color; (vi) parameter $\epsilon$ is a regularization term whose relative weight determines the smoothness of output image h; (vii) laplacian matrix L is defined as a diagonal matrix, D, and a weight matrix, W, with the formulation L=D−W, where diagonal matrix D is further defined as $D_{ii} = \#[k|i \in w_k]$ at its diagonal, which represents the cardinality of the number of windows of which the pixel i is a member, individual terms of the weight matrix W are given by $$W_{ij} = \sum_{k|(i,j)\in w_k} \frac{1}{|w_k|}\left(1 + (I_i - \mu_k)\left(\sigma_k + \frac{\varepsilon}{|w_k|}I_3\right)^{-1}(I_j - \mu_k)\right)$$

and weight matrix $W_{ij}$ is evaluated over all possible overlapping windows that contain the center pixel; and (b) interpolating the input image I to a resolution higher than its native resolution; (c) combining the results of step (a) with the interpolated, higher resolution image of step (b).

In this approach, step (b) generates detail line information of the input image I, and step (c) adds this line information to the interpolated, higher resolution image.

Preferably, step (a) is applied to the input image I in its native color space, which is the RGB color space.

The present invention may further be applied in a method of smoothing an input image I, having: providing the digital input image, I, in physical memory, the input image having color information in a native color space for each image pixel; providing a processing device coupled to the physical memory to access the input image I and create an output image, h, by implementing the following steps: (a) applying the following sequence to the input image I, $$h_{\sigma,\varepsilon}(x) = \frac{\sum_{y \in \Omega_x} (f_s^\sigma(x,y) L_{xy}^\varepsilon I(y))}{\sum_{y \in \Omega_x} (f_s^\sigma(x,y) L_{xy}^\varepsilon)}$$

where: (i) x and y are pixel locations over an image grid; (ii) $\Omega_x$ is the neighborhood induced around the central pixel x; (iii) $f_s(x,y)$ measures the spatial affinity between pixels at x and y; (iv) parameter $\sigma$ controls an amount of spatial blurring;

(v) $L_{xy}^{\epsilon}$ is a laplacian matrix that provides positive color affinity value for two examined pixels, x and y, that have the same color and provides a zero color affinity value for pixels with different color; (vi) parameter $\epsilon$ is a regularization term whose relative weight determines the smoothness of output image h; (vii) laplacian matrix L is defined as a diagonal matrix, D, and a weight matrix, W, with the formulation L=D−W, where diagonal matrix D is further defined as $D_{ii}$=#[k|i∈$w_k$] at its diagonal, which represents the cardinality of the number of windows of which the pixel i is a member, individual terms of the weight matrix W are given by $$W_{ij} = \sum_{k|(i,j) \in w_k} \frac{1}{|w_k|} \left( 1 + (I_i - \mu_k) \left( \sigma_k + \frac{\varepsilon}{|w_k|} I_3 \right)^{-1} (I_j - \mu_k) \right)$$

and terms of $W_{i,j}$ are evaluated by counting the contribution of only the center pixel's local window defined as the window centered about it.

Preferably, the local window w is a 3×3 pixel window. Further preferably, regularization factor of $\epsilon$ is at last 0.1.

Like before, the present method may be applied directly to the input image I in its native color space, which typically is the RGB color space.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 3a illustrates an original image with sharp edges.

FIG. 3b illustrates an edge-rounding effect of applying the bilateral filter on the original image of FIG. 3a.

FIG. 3c illustrates an edge-preserving effect of applying the Bi-affinity filter on the original image of FIG. 3a.

FIG. 6 shows the effect of regularization term $\epsilon$ for a fixed window size, as regularization term $\epsilon$ assigned values of 0.0005, 0.005, 0.05, and 0.5.

FIG. 8 shows compares the results of applying the present Bi-affinity filter to an input image with the results of applying a bilateral filter to the input image in its native RGB color domain and after being converted to the CIELAB color space.

FIG. 9 shows an additional set of experimental results similar to those of FIG. 8 for comparing the Bi-affinity filter to the bilateral filter in both the native RGB color space and in the CIELAB color space.

FIG. 10 shows an additional set of experimental results similar to those of FIG. 8 for comparing the Bi-affinity filter to the bilateral filter in both the native RGB color space and in the CIELAB color space.

DESCRIPTION OF THE PREFERRED EMBODIMENTS

Figure 1:
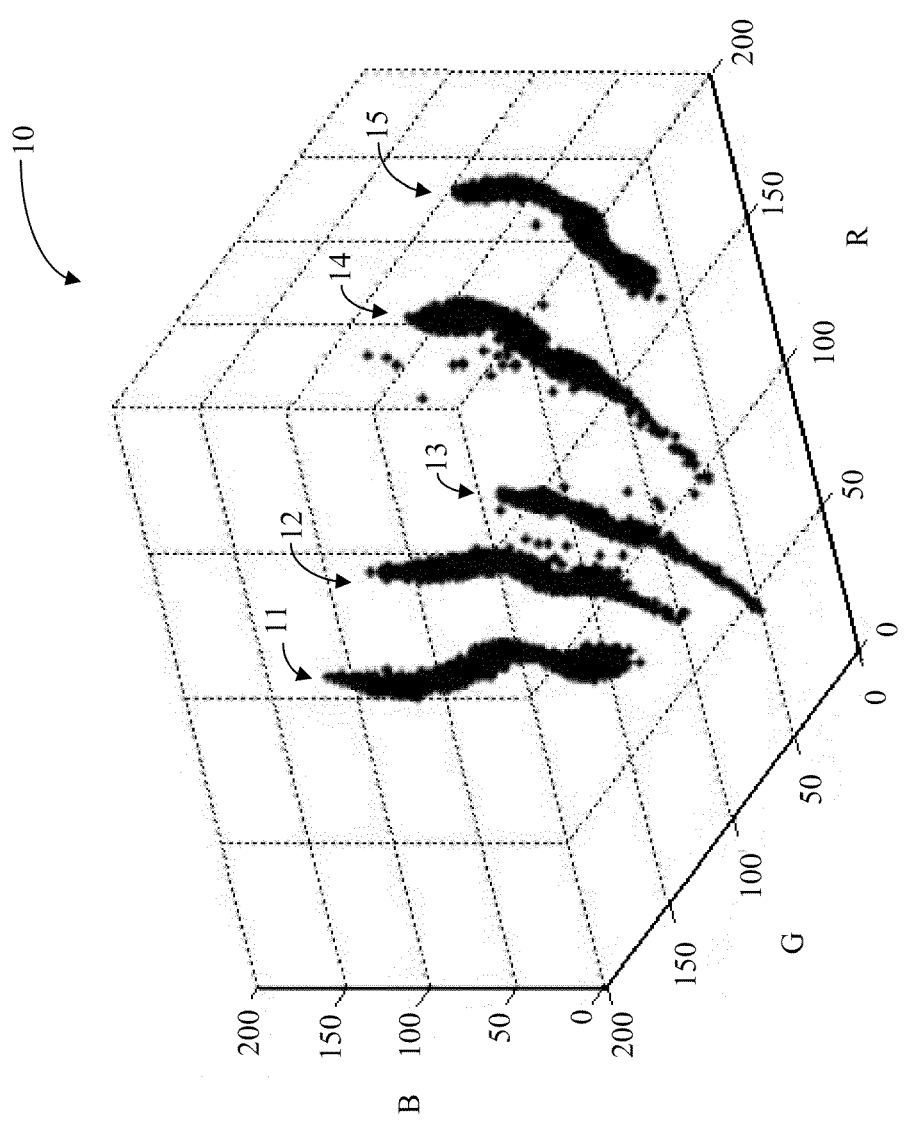
FIG. 1 is an RGB color histogram of real world, natural, color images.

It is presently proposed that the true power of the bilateral filter is yet to be realized owing to the fact that very few family of kernels have been tried with the bilateral paradigm.

Traditionally, research has overlooked one of the most important shortfalls of the bilateral filter, which is a unified handling of multi-channel color images. This is due to the fact that color channels are traditionally assumed to be independent of each other, and the filter therefore processes each color channel independently. For example, an RGB color space, which has three color channels (red, green, and blue), requires separate application of the bilateral filter to each of three color channels. As a direct consequence of this, the bilateral filter produces color artifacts at sharp color edges in the RGB color space. This poses a problem since the RGB color space is typically the native color space of color digital images, i.e. images obtained through various digital imaging techniques, such as digital photography or image scanning operations.

One remedy previously proposed is to convert from the native RGB color space to the CIELAB color space, which attempts to approximate human vision (or perception). Like the RGB color space, the CIELAB color space also has three color channels, and thus still requires that the bilateral filter be applied independently to each of three color channels, but the CIELAB is noted for avoiding color artifacts. That is, according to this approach, once the native RGB color image is converted to the CIELAB color space, then channel wise bilateral filter processing does not produce the artifacts apparent from processing in the RGB color space.

The present discussion further investigates this weakness and proposes a new technique that works at par with the transformed domain techniques (i.e. converting from a native RGB color space to an alternate color space) that have been the standard practices within the digital imaging community, thus far.

A new filter, hereafter called a "Bi-affinity filter", for color images is presently proposed. This filter is similar in structure to a bilateral filter, but the proposed Bi-affinity filter is based on a color line model. As will be shown, this approach permits the elimination of the explicit conversion from the RGB color space to perception based color spaces, such as CIELAB.

The present Bi-affinity filter measures the color affinity of a pixel to a small neighborhood around it and weighs the filter term accordingly. It is put forth that this method can perform at par with standard bilateral filters for color images. An added benefit of the present Bi-affinity filter is that not only does it preserve big edges of an input image (a desired characteristic of the bilateral filter), but also preserves and enhances small edges of the input image, which leads to additional applications as an image enhancement filter.

As is explained above, the principle objective of the bilateral filter is to combine information from the spatial domain with a feature domain, and this feature domain is generally the color domain. Determining color affinity between pixels in color images in the RGB domain is complicated by differences in light intensity causing pixels that are close in color to appear quite different and thus have markedly different RGB values. It is therefore generally preferred to convert from the RGB color space to an alterante color space better capable to filtering out difference in light intensity, and apply the bilateral filter in the alternate color space.

Many alternative color spaces have been suggested to separate color from light intensity and create methods for determining whether two pixels share the same color, or not. These color spaces can be divided into two groups, namely linear and non-linear. Among the linear color spaces, the most widely used are the YCrCb, YUV, and YIQ color spaces. Among the non-linear color spaces, two sub-groups are popular: a first sub-group that separates color into hue (i.e. color), saturation (i.e. purity), and value (i.e. light intensity), and a second sub-group that separates color into luminance plus two color coordinates. The first group may further include the HSV, HSI, HSB, HSL, etc. color spaces. The second group are the CIELAB and CIE-LUV color spaces that separate color into luminance (i.e. light intensity) and two color coordinates in an effort to create a color space that is perceptually uniform (i.e. close to how the human eye perceives color variations).

To determine whether two pixels have the same real world color, or not, the color coordinates of a generic color model are used. These color models assume either that there is no color distortion or that there is an identical color distortion for all imaging conditions. In practice, when dealing with real world images of an unknown source, these assumptions are rarely true as scene surface color is distorted differently in different images as well as different image regions, depending on the scene and camera settings.

This leads to the topic of the color line model. The introduction of color lines has been attributed to Omer et al. in *Color lines: Image Specific Color Representation*, CVPR, 2004, herein incorporated in its entirety by reference. Omer et al. proposed that color natural images form clusters of pixel colors in the RGB color space. These clusters of pixels appear to form mostly tubular regions, due to the fact that most small regions in natural images can be decomposed into a linear combination of 2 colors. This lead to the two-color model, described below.

With reference to FIG. 1, when looking at the RGB color histogram 10 of real world, natural images, it can be clearly observed that the histogram is very sparse and structured. The color line model exploits these two properties of RGB color histograms by describing the elongated color clusters, or tubular regions, 11-15. Since the structure and arrangement of the color clusters 11-15 are specific to an image, this results in an image-specific color representation that has two important properties: robustness to color distortion and a compact description of colors in an image. This idea has been used for image matting (i.e. separation of a foreground subject from its surrounding background), Bayer demosaicing (i.e. reconstruction of a color image from incomplete color samples output from an image sensor overlaid with a Bayer color filter array), and more recently for image de-noising and de-blurring.

The two-color model states that any pixel color $I_i$ in an image I can be represented as a linear combination of two colors P and S, where these colors are piecewise smooth and can be derived from local properties within a small neighborhood containing the pixel i.

$$I_i = \alpha_i P + (1-\alpha_i)S, \forall i \in w, 0 \leq \alpha_i \leq 1 \quad (5)$$

where w is a small patch, or window, and α is the matting coefficient. The patch size is a key parameter in this two-color model, as it is true for only small neighborhoods, relative to the resolution and size of the image. These "small" neighborhoods are typically defined as 3×3 pixel neighborhoods. As the resolution and the size of the images grow, so should the window size as well, to capture a valid neighborhood.

As Levin et al. show in *A Closed Form Solution to Natural Image Matting*, CVPR, 2006 (herein incorporated in its entirety by reference), a similar line of reasoning may be used for color images. For color images, if the color line property is obeyed, then the 4D linear model satisfied by the matting coefficient, within a small window, at each pixel can be written as $$\alpha_i = \sum_c a^c I_i^c + b, \forall\ i \in w, c \in \{1, 2, 3\} \quad (6)$$

Where α are weights for each color channel, which is constant for the window w, b is a model parameter, and c is an index that is unique for each window over the color channels.

A cost function for evaluating the matting coefficient α can be formulated from this model. For an image with N pixels, the cost is defined as $$J(\alpha, a, b) = \sum_{k \in N} \left( \sum_{i \in w_k} \left( \alpha_i - \sum_c a_k^c I_i^c - b_k \right)^2 + \varepsilon \sum_c a_k^{c2} \right) \quad (7)$$

where $w_k$ is a small window around pixel k and a={$\alpha_i^c$}, for all i=[1,N]. ε is a regularization weight for uniqueness as well as smoothness of the solution.

A first theorem is herein proposed, as follow.

Theorem 1: Let $J(\alpha) = \min_{a,b} J(\alpha, a, b)$, then $J(\alpha) = \alpha^T L \alpha$, where L is a laplacian matrix. As it is known in the art, and in particular in the mathematical field of graph theory, a laplacian matrix (also called an admittance matrix or Kirchhoff matrix, is a matrix representation of a graph. Together with Kirchhoff's theorem, it can be used to calculate the number of spanning trees for a given graph. In the present case, L is an n×n matrix, whose ij$^{th}$ element is given by $$\sum_{k|(i,j) \in w_k} \left( \delta_{ij} - \frac{1}{|w_k|}(1 + (I_i - \mu_k)^T \Sigma_k^{-1}(I_j - \mu_k)) \right) \quad (8)$$

where $\delta_{ij}$ is the Kronecker delta, $\mu_k$ is a 3×1 mean vector of colors inside the $k^{th}$ window with both i and j as members, $I_i$ and $I_j$ are the color vectors at location i and j, $$\hat{\Sigma}_k = \Sigma_k + \frac{\varepsilon}{|w_k|} I_3,$$

where $\Sigma_k$ is the 3×3 covariance matrix, $|w_k|$ is the cardinality of the window and $I_3$ is the 3×3 identity matrix.

Proof: Levin et. al. provide a limited proof based on an extension from a gray scale case. Below is presented a full 3-channel proof that can be readily extended to more channels, if necessary. Rewriting Eq. 7 in a matrix notation, where $\|\cdot\|$ denotes the 2-norm, $$J(\alpha, a, b) = \sum_k \|G_k \cdot \bar{a}_k - \alpha_k\| \qquad (9)$$

where $$G_k = \begin{bmatrix} I_1^R & I_1^G & I_1^B & 1 \\ \vdots & \vdots & \vdots & \vdots \\ I_{w_k}^R & I_{w_k}^G & I_{w_k}^B & 1 \\ \sqrt{\varepsilon} & 0 & 0 & 0 \\ 0 & \sqrt{\varepsilon} & 0 & 0 \\ 0 & 0 & \sqrt{\varepsilon} & 0 \end{bmatrix}, \bar{a}_k = \begin{bmatrix} a_k^R \\ a_k^G \\ a_k^B \\ b \end{bmatrix}, \alpha_k = \begin{bmatrix} \alpha_1 \\ \vdots \\ \alpha_{w_k} \\ 0 \\ 0 \\ 0 \end{bmatrix} \qquad (10)$$

Note that another representation of $G_k$ is possible where the last 3 rows are combined to a single row of the form $[\sqrt{\varepsilon}\sqrt{\varepsilon}\sqrt{\varepsilon}0]$, but this form leads to an unstable covariance matrix. For known $\alpha_k$, the least square problem can be solved $$\bar{a}_k = \text{argmin} \|G_k \bar{a}_k - \alpha_k\| \qquad (11)$$

$$= (G_k^T G_k)^{-1} G_k^T \alpha_k \qquad (12)$$

Substituting this solution in Eq. 9, and denoting $L_k = I_{|w_k|+3} - G_k(G_k^T G_k)^{-1} G_k^T$, where $I_{|w_k|+3}$ is the identity matrix of size $(|w_k|+3)$, one obtains, $$J(\alpha) = \sum_k \|L_k \alpha_k\| \qquad (13)$$

$$= \sum_k (\alpha_k^T L_k^T L_k \alpha_k)$$

Making the additional observation that $$L_k^T L_k = (I_{|w_k|+3} - G_k(G_k^T G_k)^{-1} G_k^T)^T (I_{|w_k|+3} - G_k(G_k^T G_k)^{-1} G_k^T)$$
$$= I_{|w_k|+3} + G_k(G_k^T G_k)^{-1} G_k^T G_k (G_k^T G_k)^{-1} G_k^T - 2 G_k(G_k^T G_k)^{-1} G_k^T$$
$$= I_{|w_k|+3} - G_k(G_k^T G_k)^{-1} G_k^T$$
$$= L_k$$

one can write equation (13) as $J(\alpha) = \Sigma_k(\alpha_k^T L_k \alpha_k)$. To complete the proof one needs to find the expression for $L_k|_{i,j}$.

Noting the identity $E[X^2] = \sigma_{XX}^2 + E[X]^2$, denoting the individual channel means $E[R]$ as $R$, one can write $$G_k^T G_k = \qquad (14)$$
$$|w| \begin{bmatrix} \overbrace{\begin{pmatrix} \sigma_{RR}^2 + R^2 + \frac{\varepsilon}{|w_k|} & \sigma_{RG}^2 + RG & \sigma_{RB}^2 + RB \\ \sigma_{GR}^2 + GR & \sigma_{GG}^2 + G^2 + \frac{\varepsilon}{|w_k|} & \sigma_{GB}^2 + GB \\ \sigma_{BR}^2 + BR & \sigma_{BG}^2 + BG & \sigma_{BB}^2 + B^2 + \frac{\varepsilon}{|w_k|} \end{pmatrix}}^{A} & \overbrace{\begin{pmatrix} R \\ G \\ B \end{pmatrix}}^{D} \\ \underbrace{(R \quad G \quad B)}_{D^T} & \underbrace{1}_{C} \end{bmatrix}$$

where the matrix has been divided into 4 components. Note that $D = \mu_k$ for the $k^{th}$ window. The inverse of the above system can now be written as:

$$(G_k^T G_k)^{-1} = \frac{1}{|w_k|} \begin{bmatrix} P & Q \\ R & S \end{bmatrix}$$

$$P = (A - DC^{-1} D^T)^{-1}$$
$$= (A - DD^T)^{-1}$$
$$= \begin{bmatrix} \sigma_{RR}^2 + \frac{\varepsilon}{|w_k|} & \sigma_{RG}^2 & \sigma_{RB}^2 \\ \sigma_{GR}^2 & \sigma_{GG}^2 + \frac{\varepsilon}{|w_k|} & \sigma_{GB}^2 \\ \sigma_{BR}^2 & \sigma_{BG}^2 & \sigma_{BB}^2 + \frac{\varepsilon}{|w_k|} \end{bmatrix}^{-1}$$
$$= \hat{\Sigma}_k^{-1}$$

$$Q = -P(DC^{-1}) = -PD = -\hat{\Sigma}_k^{-1} \mu_k$$
$$R = -(C^{-1} D^T)P = -D^T P = -\mu_k^T \hat{\Sigma}_k^{-1}$$
$$S = C^{-1} - R(DC^{-1}) = 1 - RD = 1 + \mu_k^T \hat{\Sigma}_k^{-1} \mu_k$$

Putting all the terms together, one can write $$(G_k^T G_k)^{-1} = \frac{1}{|w_k|} \begin{bmatrix} \hat{\Sigma}_k^{-1} & -\hat{\Sigma}_k^{-1} \mu_k \\ -\mu_k^T \hat{\Sigma}_k^{-1} & 1 + \mu_k^T \hat{\Sigma}_k^{-1} \mu_k \end{bmatrix} \qquad (15)$$

$$G_k (G_k^T G_k)^{-1} = \frac{1}{|w_k|} \begin{bmatrix} (I_1 - \mu_k)^T \hat{\Sigma}_k^{-1} & 1 - (I_1 - \mu_k)^T \hat{\Sigma}_k^{-1} \mu_k \\ (I_2 - \mu_k)^T \hat{\Sigma}_k^{-1} & 1 - (I_2 - \mu_k)^T \hat{\Sigma}_k^{-1} \mu_k \\ \vdots & \vdots \\ (I_{w_k} - \mu_k)^T \hat{\Sigma}_k^{-1} & 1 - (I_{w_k} - \mu_k)^T \hat{\Sigma}_k^{-1} \mu_k \\ \sqrt{\varepsilon} \hat{\Sigma}_k^{-1} & \sqrt{\varepsilon} \hat{\Sigma}_k^{-1} \mu_k \end{bmatrix} \qquad (16)$$

Right multiplication by $G_k^T$ yields the final symmetric form, where only the $i^{th}$ column is shown for conciseness and ease of understanding $$G_k (G_k^T G_k)^{-1} G_k^T [:, i] = \frac{1}{|w_k|} \begin{bmatrix} 1 + (I_1 - \mu_k)^T \hat{\Sigma}_k^{-1} (I_i - \mu_k) \\ 1 + (I_2 - \mu_k)^T \hat{\Sigma}_k^{-1} (I_i - \mu_k) \\ 1 + (I_3 - \mu_k)^T \hat{\Sigma}_k^{-1} (I_i - \mu_k) \\ \vdots \\ 1 + (I_{w_k} - \mu_k)^T \hat{\Sigma}_k^{-1} (I_i - \mu_k) \\ \varepsilon \hat{\Sigma}_k^{-1} (I_i - \mu_k) \end{bmatrix}$$

Subtracting from $I_{|w_k|+3}$ and summing over k concludes the proof. Note that $G_k$ has 3 extra rows (or C extra rows for general case) for the regularization $\epsilon$. These can be neglected in the final expression since they do not explicitly effect the other computations.

As is stated above, laplacian matrix L, is an n×n matrix. It is note that in L, n may also be understood to be the total number of pixels in the image, whose $(ij)^{th}$ element is given by $$\sum_{k|(i,j)\in w_k} \left(\delta_{ij} - \frac{1}{|w_k|}\left(1 + (I_i - \mu_k)\left(\sigma_k + \frac{\epsilon}{|w_k|}I_3\right)^{-1}(I_j - \mu_k)\right)\right) \quad (17)$$

where $\delta_{ij}$ is the Kronecker delta, $\mu_k$ is a 3×1 mean vector of colors inside the $k^{th}$ window with both i and j as members, $\sigma_k$ is the 3×3 covariance matrix, $|w_k|$ is the cardinality of the window and $I_3$ is the identity matrix of size 3×3. Note that the term $\epsilon$ is a regularization term and determines the smoothness of the decomposition into two dominant color modes (i.e. two colors P and S). The laplacian matrix defined by L has been termed the matting laplacian.

The usual decomposition of the laplacian matrix L into a diagonal matrix, D, and a weight matrix, W, leads to the formulation L=D−W. Here D is a diagonal matrix with the terms $D_{ii}$=#$[k|i\in w_k]$ at its diagonal, which represents the cardinality of the number of windows of which the pixel i is a member. The individual terms of the weight matrix W are given by $$W_{ij} = \sum_{k|(i,j)\in w_k} \frac{1}{|w_k|}\left(1 + (I_i - \mu_k)\left(\sigma_k + \frac{\epsilon}{|w_k|}I_3\right)^{-1}(I_j - \mu_k)\right) \quad (18)$$

This brings the present discussion to the subject of the Bi-affinity filter. It is first noted that by the definition of the laplacian matrix, all its rows sum to zero, which leads to $D_{ii}=\Sigma_j W_{ij}$. At the local minima, the solution $\alpha^*$ satisfies the first order optimality condition $L^T\alpha^*=0$. So the optimal condition can be written as $$L^T\alpha^* = (D - W)^T\alpha^* \quad (19)$$

$$L^T\alpha^* = \begin{pmatrix} D_{11}\alpha_1^* - \sum_j W_{1j}\alpha_j^* \\ D_{22}\alpha_2^* - \sum_j W_{2j}\alpha_j^* \\ \vdots \\ D_{nn}\alpha_n^* - \sum_j W_{Nj}\alpha_j^* \end{pmatrix} \quad (20)$$

Substituting $D_{ii}=\Sigma_j W_{ij}$ into the above system of equations and invoking the first order optimality condition leads to $$\begin{pmatrix} \sum_j (\alpha_1^* - \alpha_j^*)W_{1j} \\ \sum_j (\alpha_2^* - \alpha_j^*)W_{2j} \\ \vdots \\ \sum_j (\alpha_n^* - \alpha_j^*)W_{nj} \end{pmatrix} = 0 \quad (21)$$

The effect of this equation is that the color affinity $W_{ij}$ for two pixels with the same color (same $\alpha^*$), is a positive quantity varying with the homogeneity of the local windows containing the pixels i and j as governed by Eqn. 18. But for pixels with different color (different $\alpha^*$) the color affinity is zero. In essence the rows of the laplacian matrix L work as a zero-sum filter kernel, after appropriate resizing of the window.

This leads to the formulation of the Bi-affinity filter as:

$$h_{\sigma,\epsilon}(x) = \frac{\sum_{y\in\Omega_x}(f_s^\sigma(x,y)L_{xy}^\epsilon I(y))}{\sum_{y\in\Omega_x}(f_s^\sigma(x,y)L_{xy}^\epsilon)} \quad (22)$$

Figure 2:
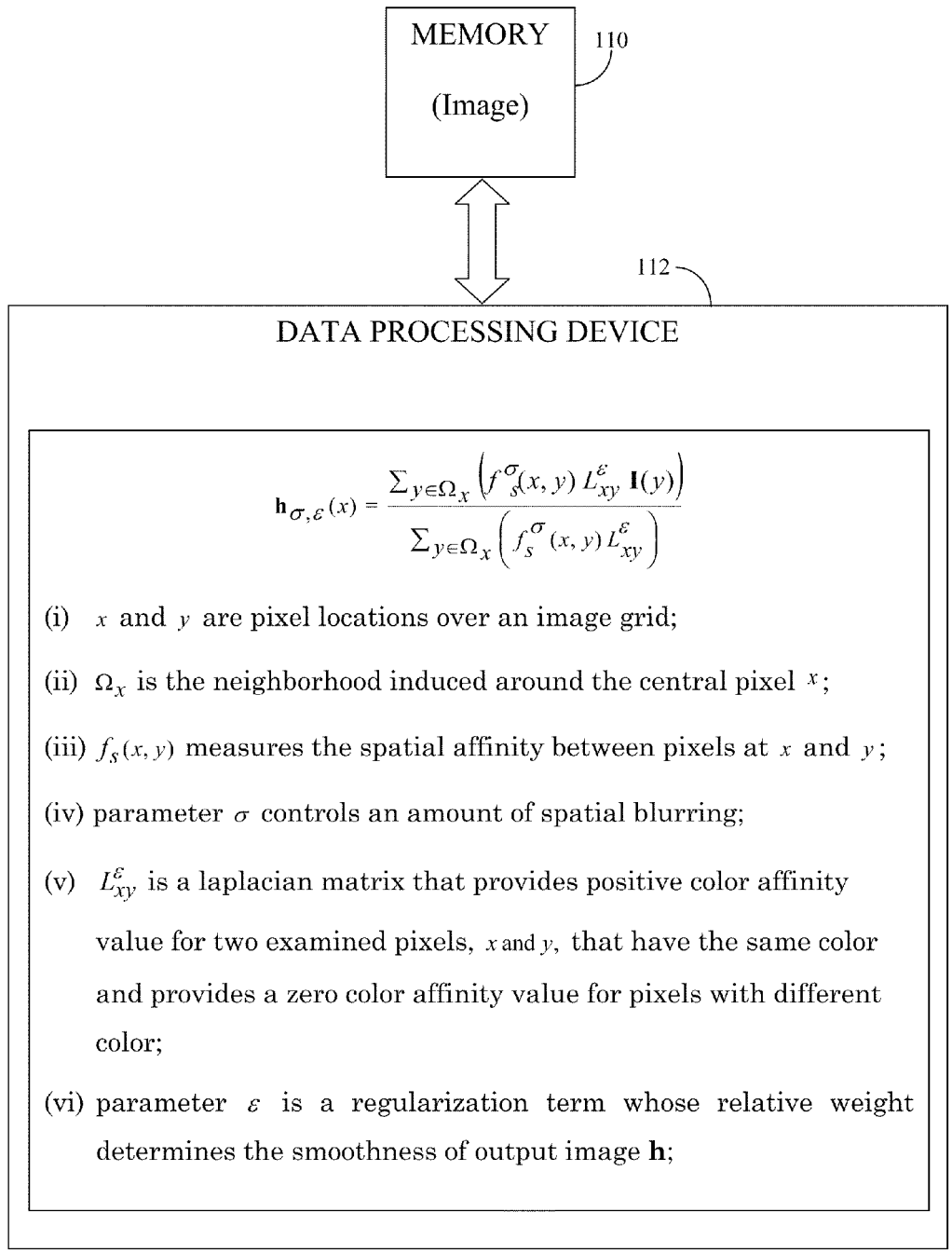
FIG. 2 illustrates a sample setup for implementing the present Bi-affinity filter.

FIG. 2 illustrates a sample setup for implementing the present Bi-affinity filter. The input image may be provided in a digital memory 110 that is in communication with a data processing device 112, such as a CPU, ASIC, PLD, CPLD, or other type of data processing or computing device. In the present case, the data processing device processing the input image in memory 110 according to processing steps defined by equation 22, where the dependence on user specified parameters $\sigma,\epsilon$ on the filter output are denoted. I and h are the input and output images respectively, x and y are pixel locations over an image grid, and $\Omega_x$ is the neighborhood induced around the central pixel x. In the present case, $f_s(x,y)$ measures the spatial affinity between pixels at x and y, where parameter $\sigma$ controls the amount of spatial blurring and serves a similar purpose as the spatial filter variance (i.e. $\sigma_s$ in eqn. 3) in a traditional bilateral filter. $L_{xy}^\epsilon$ is the laplacian matrix (or matting laplacian) that provides positive color affinity value for two examined pixels, x and y, that have the same color and provides a zero color affinity value for pixels with different color. The parameter $\epsilon$, a regularization term, works analogous to the range variance parameter (i.e. $\sigma_r$ in eqn. 4) in a traditional bilateral filter. Note that the relative weight attributed to regularization term $\epsilon$, determines the smoothness of the $\alpha$ estimates (i.e. the smoothness of color blending from pixel to pixel), which in the present work translates to the smoothness of the filtered image. The output image h may be saved back to memory 110 or may be stored in another memory device, not shown.

However, the Bi-affinity filter does not smooth the edge, due to the affinity formulation which is zero across the edge. This is in direct contrast to the Bilateral filter, which has an inherent bending effect at the edges. This image distortion can be observed in FIGS. 3a-3c. FIG. 3a is an example of an original image with a sharp image. FIG. 3b shows the result of applying bilateral filtering. As is shown, bilateral filtering results in rounding of the edges. By contrast, applying Bi-affinity filtering preserves edge sharpness, as is shown in FIG. 3c.

The calculation of the exact weight matrix $W_{ij}$ (hereafter called the "affinity matrix") as mentioned in Eqn. 18, involves evaluations over all possible overlapping windows that contain the center pixel. This involves $O(w^3)$ computations, where w is the size of the window. For example, if the window size is 3 (i.e. three pixels by three pixels), then nine computations would be required per center pixel, which is more than typically required in a traditional bilateral filter.

Figure 4A:
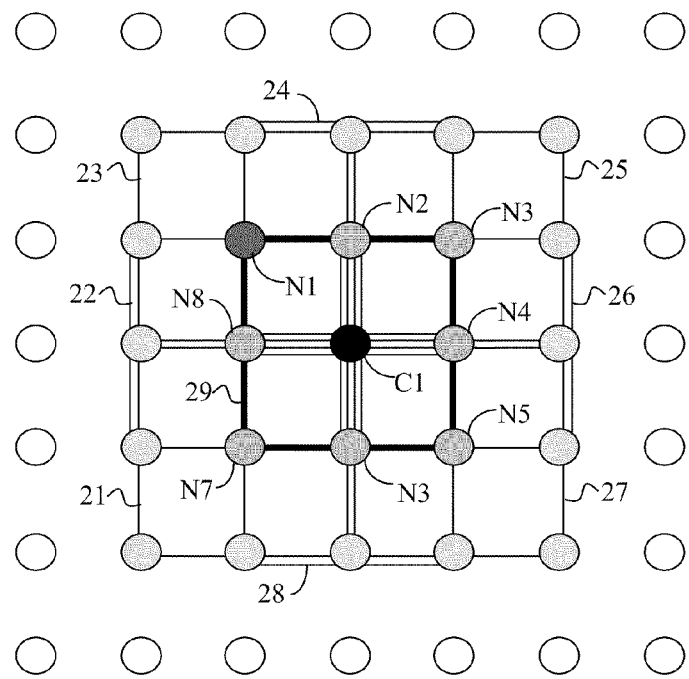
FIG. 4a shows a center pixel C1 and nine overlapping 3×3 pixel windows that include center pixel C1.

For example FIG. 4a shows a center pixel C1 and nine overlapping 3×3 pixel windows 21-29 that include center pixel C1. Neighbor pixels N1-N8 are also noted. In the present example, the color affinity between center pixel C1 and target neighbor pixel N1 is desired.

Figure 4B:
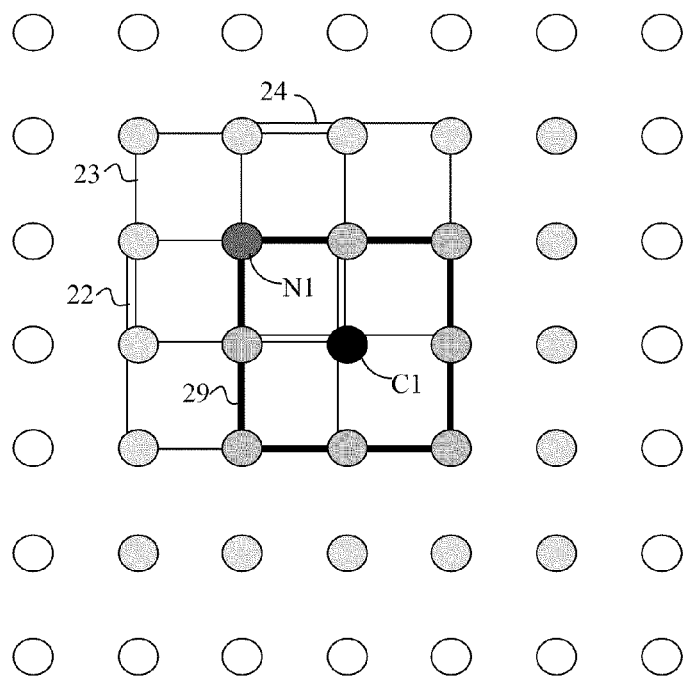
FIG. 4b the only four overlapping windows that encompass both center pixel C1 and target neighbor pixel N1.

The overall complexity can be reduced by evaluating the color affinity over a smaller set of possible windows. For example in FIG. 4b, only the four overlapping windows, 22, 23, 24, and 29, that encompass both center pixel C1 and target neighbor pixel N1 may be evaluated.

Figure 4C:
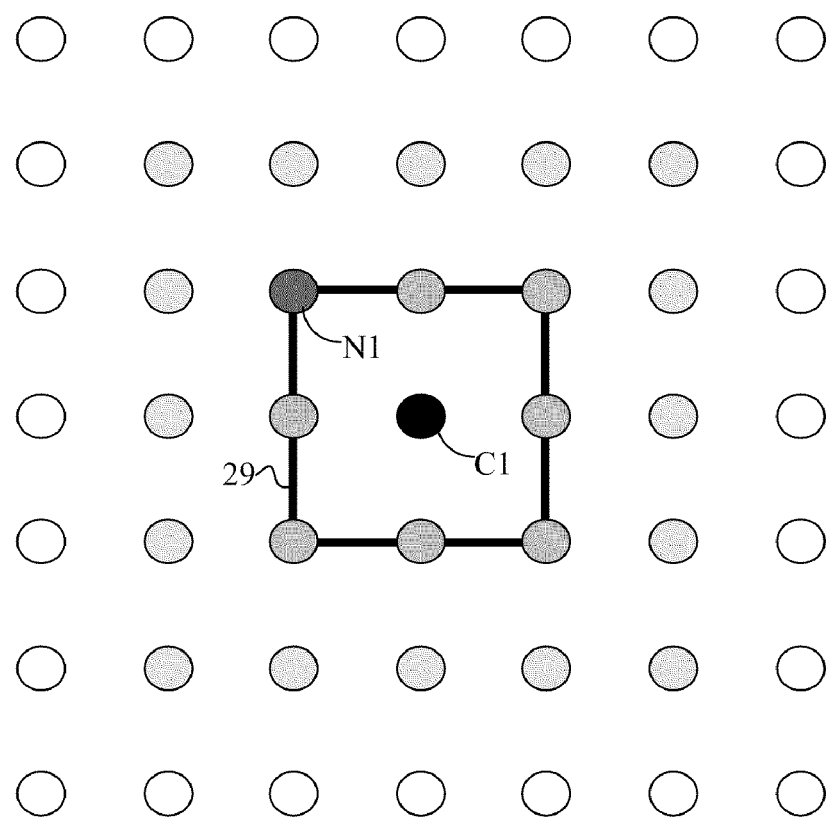
FIG. 4c shows only the center pixel's local window, which is the window centered about C1.

In the simplest case, shown in FIG. 4c, the terms of $W_{i,j}$ can be evaluated locally, i.e. counting the contribution of only the center pixel's local window, 29, which is the window centered about C1. In this case, the complexity is similar to the typical bilateral range filter, which involves $O(w^2)$ computations. This simplest case of only evaluating terms of $W_{i,j}$ local to a center pixel (i.e. only evaluating the center pixel's local window) is the basis of an approximate Bi-affinity filter.

To keep fair the following comparisons of the Bi-affinity filter with the bilateral filter (i.e. to assure that both have a similar level of complexity), the bilateral filter will instead be compared to the approximate Bi-lateral filter denoted by $h^l(x)$ and herein defined as:

$$h^l(x) = \frac{\sum_{y \in \Omega_x} f_s^\sigma(x, y) L_{xy}^{x\epsilon} I(y)}{\sum_{y \in \Omega_x} f_s^\sigma(x, y) L_{xy}^{x\epsilon}} \quad (23)$$

which considers only the local window centered around pixel x, denoted by $L^x$.

The operations involved in computing the $L_{ij}$ terms as mentioned in Eqn. 6 (or Eqn. 17), can be decomposed as summation of Gaussian likelihoods over window dependent parameters $\mu_w, \Sigma_w$. These parameters can be computed by accumulating first and second order sufficient statistics over windows. If memory complexity is not an issue then pre-computing 9 integral images can be an option. These 9 integral images correspond to 3 integral images for each of the R, G and B color channels, 3 integral images for RR, GG and BB channels, and 3 integral images for RG, GB and RB channels. For 3 channel color images, this is equivalent to storing 3 more images into the memory. For really large images (HDTV etc.) this option might not be the most optimal due to the large memory overhead.

Another method of computing the $L_{ij}$ terms is to collect sufficient statistics for the current window and then update the statistics for each unit move from top to bottom and left to right, as proposed by the median filtering approach in *Two-Dimensional Digital Signal Processing II, Transforms and Median Filters* (by T. S. Huang, pages 209-211, 1981, Springer-Verlag, which is herein incorporated in its entirety by reference) and in *Fast Median and Bilateral Filtering* (ACM Trans. Graph., 25(3):519-526, 2006, by Weiss), which is also herein incorporated in its entirety by reference. Both of these methods can now be used to implement both the full and the approximate bi-affinity filter.

The above approximate Bi-affinity filter (as described in eqn. 23) was tested.

Figure 5:
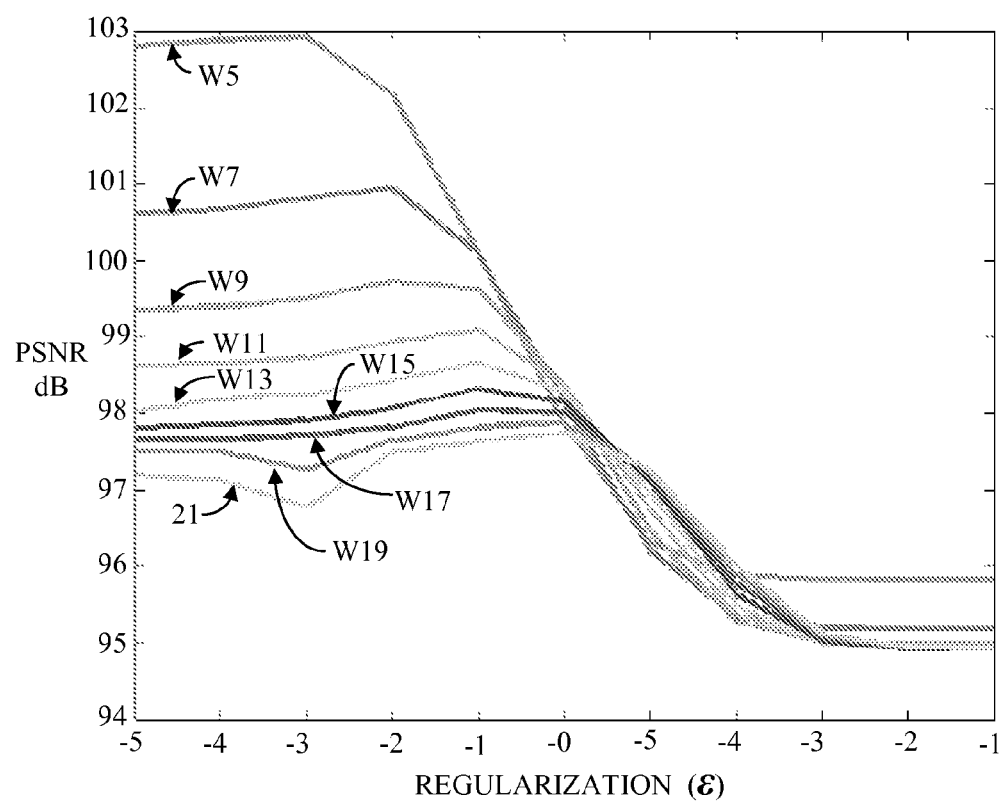
FIG. 5 illustrates the affect of varying regularization term $\epsilon$ pixel windows of varying pixel size.

With reference to FIG. 5, the regularization term $\epsilon$ in the affinity formulation works as an edge smoothness term. For understanding the effect of this term, the amount of regularization $\epsilon$ used for the process was varied for each of nine square windows, W5, W7, W9, W11, W13, W15, W17, W19, and W21, with each window having a size of 5, 7, 9, 11, 13, 15, 17, 19, and 21 pixels per side, respectively. The power-to-signal noise ratio, PSNR, for each window with respect to the original image was recorded. As shown, the PSNR degrades for larger window sizes. This is in keeping with the two color model, which is valid only for small windows. However, the regularization term $\epsilon$ neutralizes the effect of window size to a certain degree, as is evident by the band of values collecting near the PSNR value of 96 dB. This suggests a possible tradeoff between PSNR and edge smoothness. For very small regularization values, the noise across the edge can contribute to the jaggedness of the reconstruction. This effect can be countered by increasing regularization term $\epsilon$, but the increased regularization comes at the cost of increased smoothness of the overall image.

Empirically, good results have been obtained for larger window sizes by keeping values of regularization term $\epsilon$ relatively larger than those proposed in the matting literature mentioned above (i.e. preferably at least 1.5 times larger).

With reference to FIG. 6, the effect of regularization term $\epsilon$ for a fixed window size are illustrated by showing the results assigning values 0.0005, 0.005, 0.05, and 0.5 to regularization term $\epsilon$. The edge reconstruction becomes increasingly jagged as the amount of regularization is decreased, as is more clearly seen in the closeup view at the upper-right corner of each sample image.

Figure 7A:
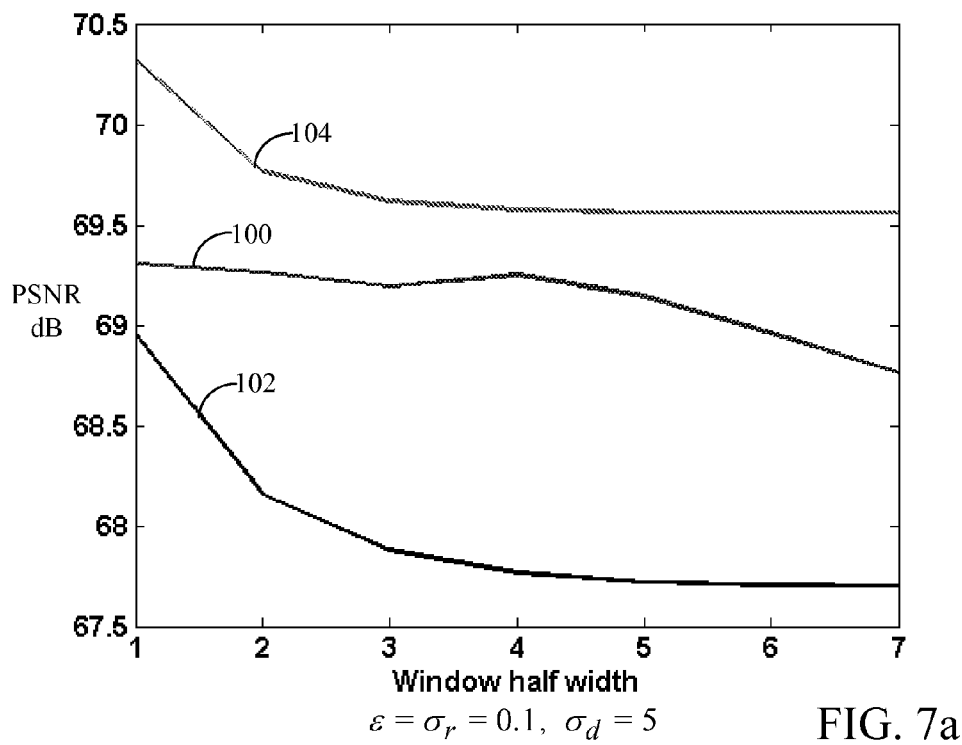
FIGS. 7a and 7b show comparisons of the PSNR of the present Bi-affinity filter applied in an image's native RGB color space versus the bilateral filter applied in both the image's native RGB color space and converted CIELAB color space are shown for a fixed range filter variance and a varied window size.
Figure 14B:
FIG. 14b shows the zoomed-in image of FIG. 14a additionally enhanced by the present Bi-affinity filter.

With reference to FIGS. 7a and 14b, comparisons of the PSNR of the present Bi-affinity filter applied in an image's native RGB color space versus the bilateral filter applied in both an image's native RGB color space and converted CIELAB color space are shown. For quantitative comparisons against the traditional bilateral filter, the window size is varied for a fixed range filter variance of 0.1 in FIG. 7a, and for a fixed range filter variance of 1.0 in FIG. 7b.

With $\epsilon = \sigma_r = 0.1$ in FIG. 7a, the PSNR values of the present Bi-affinity filter 100 is better than that of the RGB bilateral filter 102, but is lower than the CIELAB bilateral filter 104. Nonetheless, the present Bi-affinity filter 100 is still within acceptable deviations from the CIELAB bilateral filter 104.

Figure 7B:
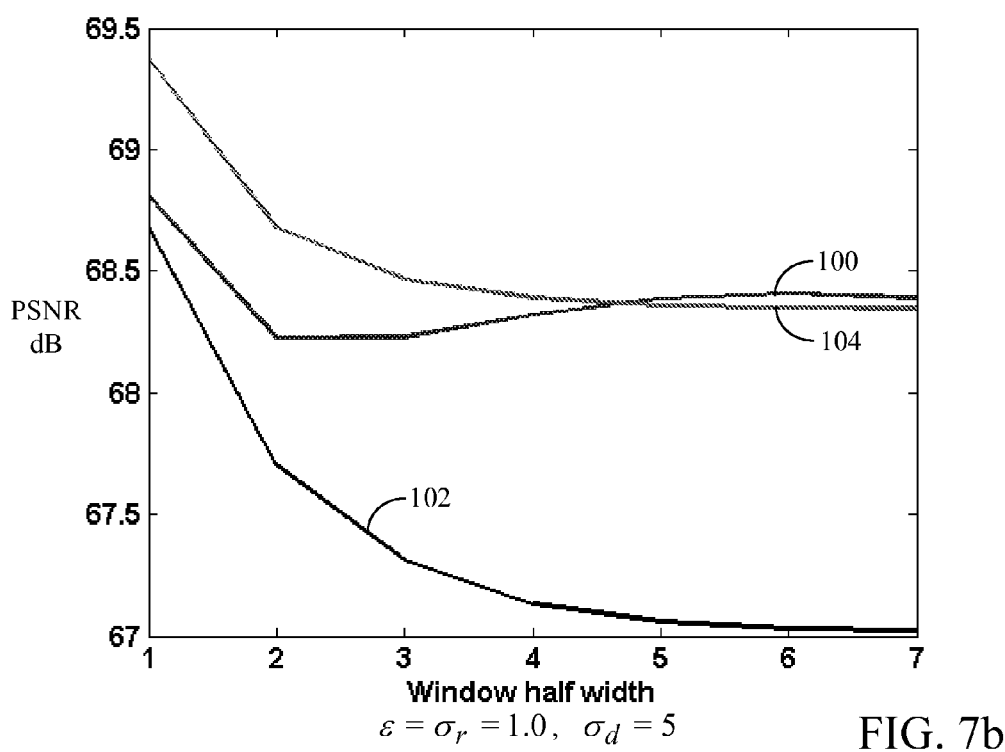

However, as is shown in FIG. 7b, when the range filter variance is increased to 1.0 (i.e. $\epsilon = 1$), the preference of the present Bi-affinity filter 100 can surpass that of the CIELAB bilateral filter 104. More specifically, when the window is increase to at least 5×5 pixels (i.e. w=5), the performance of the present Bi-affinity filter in the image's native RGB color spaces surpasses that of the bilateral filter even in the converted CIELAB color space.

As is mentioned earlier in reference to Eqn. 23, the approximate Bi-affinity filter, which is evaluated over one centered local window, closely emulates the traditional bilateral filter. The following, next experimental results compare the present approximate Bi-affinity filter to the traditional bilateral filter. These results are illustrated in FIG. 8.

With reference to FIG. 8, the upper-left corner image shows the original input image, to which the bilateral filter and the present approximate Bi-affinity filter will be applied. The results of applying the bilateral filter in the input image's native RGB color space (with the bilateral filter individually applied to each of the Red color channel, Green color channel, and Blue color channel) is shown in the upper-right corner. As shown, the resultant soften image suffers from color artifacts at sharp color edges that may be perceived as a loss in image definition.

However, if the input image is first converted from the RGB color space to the CIELAB color space, and the bilateral filter is then individually applied to each of the three CIELAB color channels, then the resultant soften image is more clearly defined, as is shown in the lower-left corner of FIG. 8.

Nonetheless, as is shown in the lower-right corner of FIG. 8, similar results are obtained by applying the present Bi-affinity filter to the original input image in its native RGB color space, with a regularization factor of $\epsilon = 0.1$. Thus, the response of the bilateral filter in the CIELAB color space and the Bi-affinity filter in the native RGB color space is very similar, even though the Bi-affinity filter does not need, or use, any color conversions, resulting in a reduction in filter processing steps.

Two additional sets of experimental results similar to those of FIG. 8 for comparing the Bi-affinity filter to the bilateral filter in both the native RGB color space and in the CIELAB color space are shown in FIGS. 9 and 10.

The present Bi-affinity filter also has applications in enhanced image zooming. The original Bi-affinity filter of Eqn. 22 (i.e. the version not limited to evaluation over only one centered local window), has been shown to preserve very minute details. In other words, the present bi-affinity formulation preserves very intricate details of an image as compared to the traditional bilateral filter, which preserves only dominant edges of an image. In this regard, the present Bi-affinity filter can be understood to preserve all edges, whereas the bilateral filter preserves only strong edges. This important feature of the Bi-affinity filter leads to one of the most interesting applications of the Bi-affinity filter: image enhancement and zooming.

Image enhancement techniques attempt to convert a low-resolution image to a high-resolution image. In effect, image enhancement techniques try to generate high-resolution data from available low-resolution data by estimating missing information. This leads to numerous formulations, some learning based and some interpolation based. Basically, if one can infer the missing high-resolution data, then one can add the missing high-resolution data to an interpolation of the low-resolution data (i.e. an enlarged or zoomed-in version of the input image) that satisfies data fidelity constraints. The result is an estimated (i.e. generated) high-resolution image.

Figure 11A:
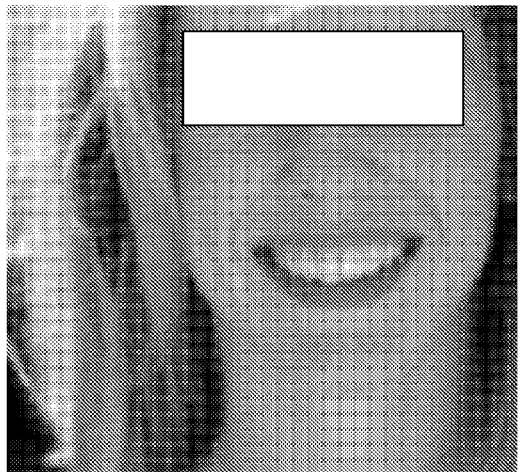
FIGS. 11a, 11b, and 11c show the application of the present Bi-affinity filter to enhance a low resolution image.
Figure 11C:
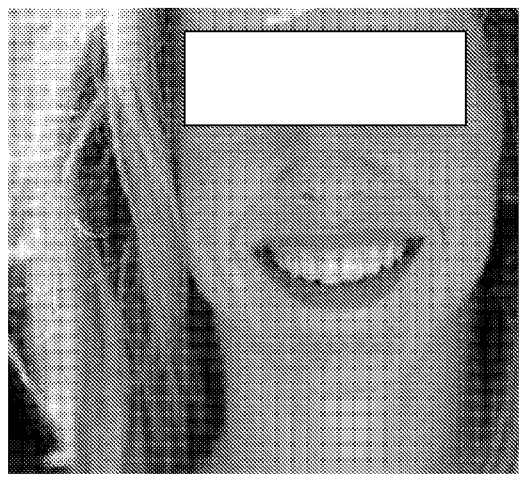
Figure 11B:
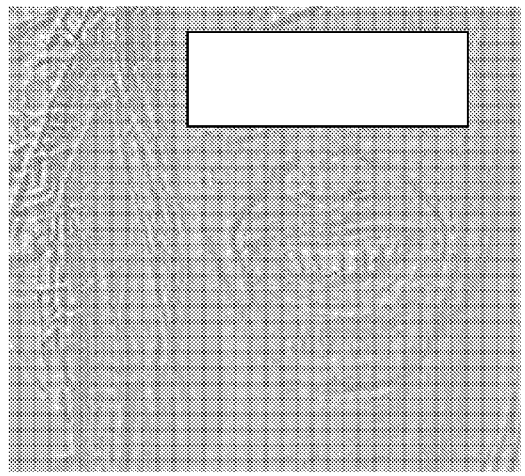

For example with reference to FIG. 11a, given a low-resolution input image, as shown, one can interpolate it to a desired higher-resolution, and then add the missing high-resolution information to generate a final high-resolution result. The mean affinity at each pixel, which is the row wise normalized summation of W, appears to contain this missing detail. This missing detail is shown in FIG. 11b. The Bi-affinity filter further places a smoothed affinity weighted kernel at each pixel, and the combined effect is the enhanced image shown in FIG. 11c. This enhancement effect is a biproduct of the filtering formulation of the Bi-affinity filter.

Figure 12A:
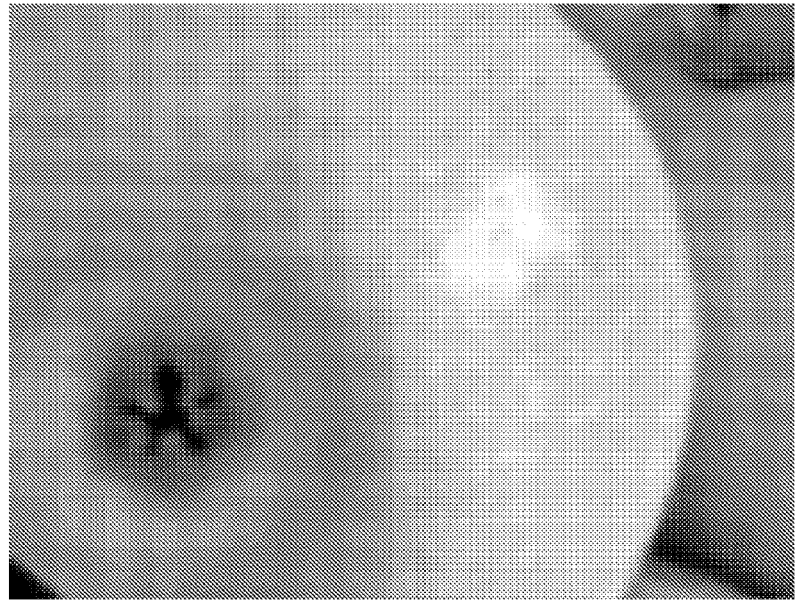
FIG. 12a shows an image zoomed-in by a factor of 2× by bi-cubic interpolation.
Figure 12B:
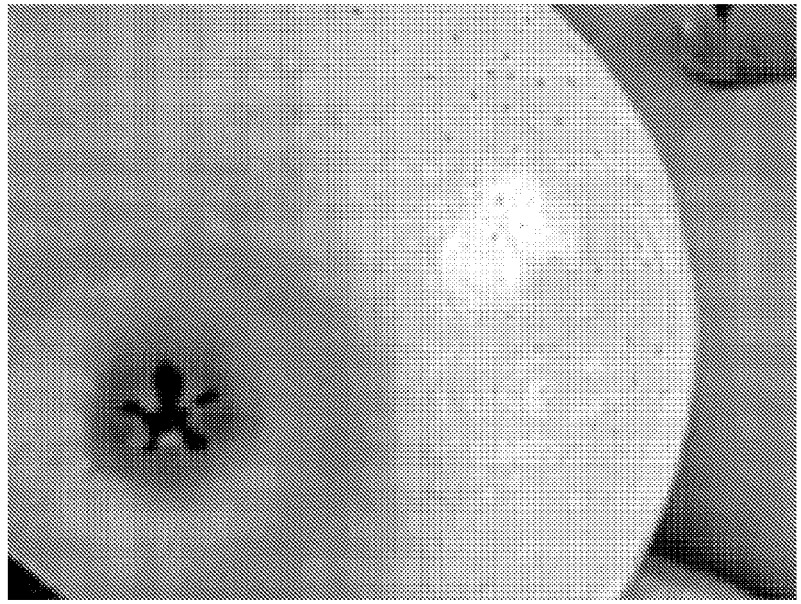
FIG. 12b shows the same zoomed-in image of FIG. 12a additionally enhanced by the present Bi-affinity filter.

A second example of the enhancement feature of the present Bi-affinity filter is shown FIGS. 12a and 12b. FIG. 12a shows an image zoomed-in by a factor of 2× by bi-cubic interpolation. FIG. 12b shows the same zoomed-in image additionally enhanced by the present Bi-affinity filter. Note the preservation of small image details.

Figure 13B:
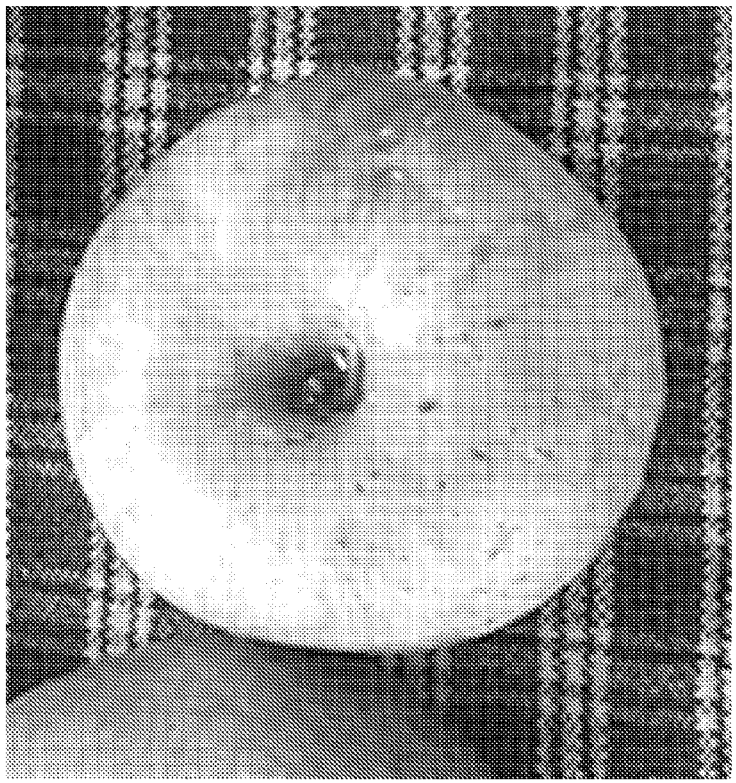
FIG. 13b shows the zoomed-in image of FIG. 13a additionally enhanced by the present Bi-affinity filter.
Figure 13A:
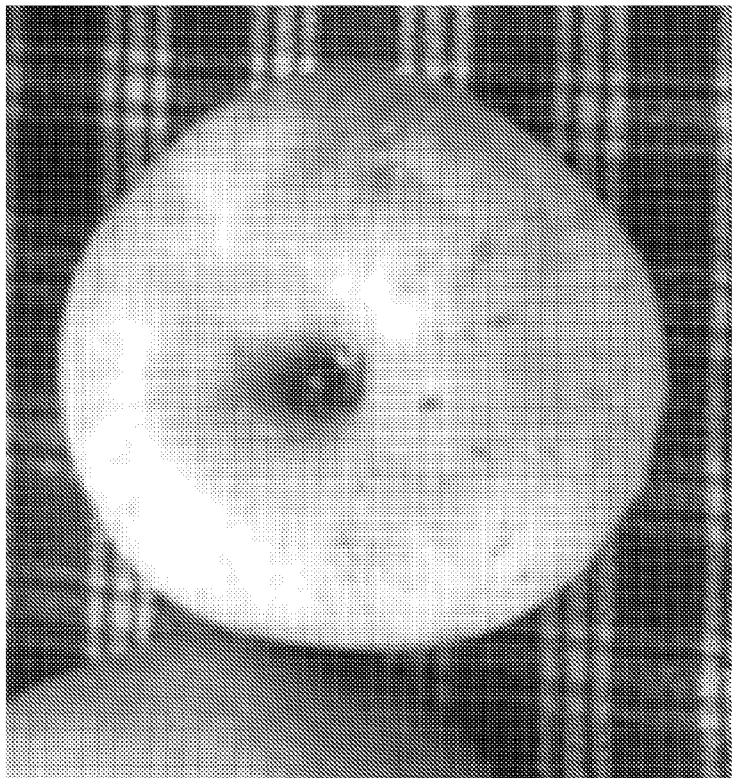
FIG. 13a shows an image zoomed-in by a factor of 2× by bi-cubic interpolation.

A third example of the enhancement feature of the present Bi-affinity filter is shown FIGS. 13a and 13b. FIG. 13a shows an image zoomed-in by a factor of 2× by bi-cubic interpolation. FIG. 13b shows the same zoomed-in image additionally enhanced by the present Bi-affinity filter.

Figure 14A:
FIG. 14a shows an image zoomed-in by a factor of 2× by bi-cubic interpolation.

A fourth example of the enhancement feature of the present Bi-affinity filter is shown FIGS. 14a and 14b. FIG. 14a shows an image zoomed-in by a factor of 2× by bi-cubic interpolation. FIG. 14b shows the same zoomed-in image additionally enhanced by the present Bi-affinity filter.

Figure 15A:
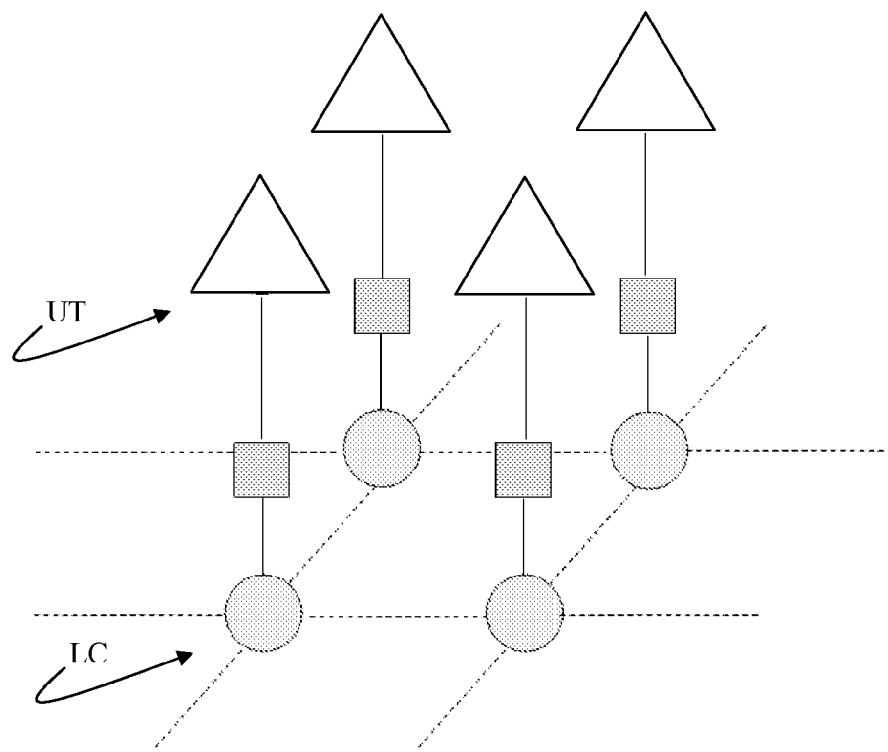
FIGS. 15a and 15b show a graphical model for image enhancement.
Figure 15B:
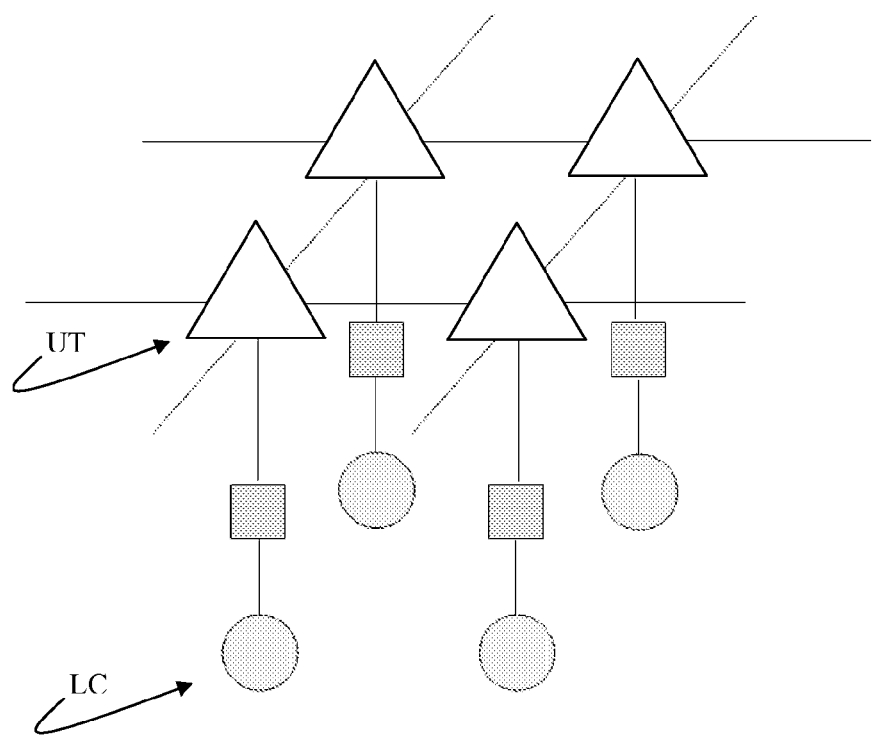

A graphical model for image enhancement is shown in FIGS. 15a and 15b. FIG. 15a illustrates a passive filtering technique and FIG. 15b illustrates an active filtering technique. In both FIGS. 15a and 15b, the circles represent observed nodes, the squares represent function nodes, and the triangles represent hidden nodes to be estimated.

The method of the present invention is a passive filtering technique, and is best described by FIG. 15a. Like other passive filtering techniques, e.g. bilateral, bicubic, etc., the present method only looks at the low-resolution observation layer (i.e. layer having lower circles LC along the dashed grid pattern) to generate the values of the high-resolution scene (i.e. the upper layer having upper triangles UT). In the present case, the filter kernel is applied to the observed node to generate the scene.

By comparison, active methods such as Markov random field (MRF) based models, shown in FIG. 15b, impose neighborhood continuity constraints in the inferred layer as well. That is, scene nodes are also influenced by the neighbors in the hidden scene field. This is typically done through inter-action potential within the scene nodes. It is presently put forth that the principles of the present invention may be applied to a such model, as well.

In summary, a new edge preserving filter, which works on the principle of matting affinity, is proposed. The formulation of matting affinity allows a better representation of the range filter term in bilateral filter class. The definition of the affinity term can be relaxed to suit different applications.

An approximate Bi-affinity filter whose output is shown to be very similar to the traditional bilateral filter is defined. The present technique has the added advantage that no color space changes are required and hence an input images can be handled in its original color space, i.e. its native color space. This is a big benefit over traditional bilateral filter, which needs a conversion from its native color space to a perception based color spaces, such as CIELAB, to generate results close to the present invention.

Furthermore, the full Bi-affinity filter preserves very minute details of the input image, and can easily be extended to an image enhancement application to permit an enhanced zooming function.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A method of processing a digital, input image, comprising:

providing said digital input image, I, in physical memory, said input image having color information in a native color space for each image pixel;

providing a processing device coupled to said physical memory to access said input image I and create an output image, h, by implementing the following steps:

(a) applying the following sequence to said input image I, $$h_{\sigma,\varepsilon}(x) = \frac{\sum_{y \in \Omega_x} (f_s^\sigma(x, y) L_{xy}^\varepsilon I(y))}{\sum_{y \in \Omega_x} (f_s^\sigma(x, y) L_{xy}^\varepsilon)}$$

where x and y are pixel locations over an image grid, and $\Omega_x$ is the neighborhood induced around the central pixel x; $f_s(x,y)$ measures the spatial affinity between pixels at x and y; parameter $\sigma$ controls an amount of spatial blurring; $L_{xy}^\varepsilon$ is a laplacian matrix that provides positive color affinity value for two examined pixels, x and y, that have the same color and provides a zero color affinity value for pixels with different color; parameter $\epsilon$ is a regularization term whose relative weight determines the smoothness of output image h.

2. The method of claim 1, wherein step (a) is applied to said input image I in its native color space.

3. The method of claim 2, wherein said native color space is the RGB color space.

4. The method of claim 1, wherein said laplacian matrix $L_{xy}^{\epsilon}$ follows a 2 color model specifying that pixel color $I_i$ in an input image I can be represented as a linear combination of two colors P and S as follows:

$$I_i = \alpha_i P + (1-\alpha_i) S, \forall i \in w, 0 \leq \alpha_i \leq 1$$

where the two colors are piecewise smooth and can be derived from local properties within neighborhood $\Omega_x$ containing the pixel i, and wherein piecewise smooth means smooth within a region of similar in size as window w.

5. The method of claim 4, wherein parameter $\epsilon$ determines the smoothness of the decomposition into said two color modes as represented by the smoothness of $\alpha$ estimates.

6. The method of claim 4, wherein $\alpha_i$ is defined as:

$$\alpha_i = \sum_c a^c I_i^c + b, \forall i \in w$$

where $\alpha$ are weights for each color channel and is constant for the window w, b is a model parameter, and c is an index over the color channels.

7. The method of claim 6, wherein the $\alpha$ values are determined according to quadratic cost function $J(\alpha) = \alpha^T L \alpha$.

8. The method of claim 7, wherein laplacian matrix L is an n×n matrix, where n is the total number of pixels in input image I whose (ij)$^{th}$ element is given by $$\sum_{k|(i,j)\in w_k} \left( \delta_{ij} - \frac{1}{|w_k|}\left(1 + (I_i - \mu_k)\left(\sigma_k + \frac{\epsilon}{|w_k|}I_3\right)^{-1}(I_j - \mu_k)\right) \right)$$

where $\delta_{ij}$ is the Kronecker delta, $\mu_k$ is a 3×1 mean vector of colors inside the k$^{th}$ window with both i and j as members, $\sigma_k$ is the 3×3 covariance matrix, $|w_k|$ is the cardinality of the window and $I_3$ is the identity matrix of size 3×3.

9. The method of claim 8, wherein the laplacian matrix L is further decomposed into a diagonal matrix D and a weight matrix W with the formulation L=D−W, wherein:
diagonal matrix D is defined with terms $D_{ii}=\#[k|i\in w_k]$ at its diagonal and represents the cardinality of the number of windows of which the pixel i is a member;
individual terms of weight matrix W are given by $$W_{ij} = \sum_{k|(i,j)\in w_k} \frac{1}{|w_k|}\left(1 + (I_i - \mu_k)\left(\sigma_k + \frac{\epsilon}{|w_k|}I_3\right)^{-1}(I_j - \mu_k)\right)$$

where $\delta_{ij}$ is the Kronecker delta, $\mu_k$ is a 3×1 mean vector of colors inside the k$^{th}$ window with both i and j as members, $\sigma_k$ is the 3×3 covariance matrix, $|w_k|$ is the cardinality of the window and $I_3$ is the identity matrix of size 3×3; and
color affinity $W_{ij}$ for two pixels with the same color is a positive quantity varying with the homogeneity of the local windows containing the pixels i and j, and color affinity for pixels with different color is zero.

10. The method of claim 9, wherein at the local minima, the solution $\alpha^*$ satisfies a first order optimality condition $L^T\alpha^*=0$, and the optimal condition is defined as $L^T\alpha^*=(D-W)^T\alpha^*$.

11. The method of claim 9, wherein terms of $W_{i,j}$ are evaluated by counting the contribution of only the center pixel's local window defined as the window centered about it.

12. The method of claim 11, wherein the local window w is a 3×3 pixel window requiring $O(w^2)$ computations.

13. The method of claim 1, further including:
(b) interpolating said input image I to a resolution higher than its native resolution;
(c) combining the results of step (a) with the interpolated, higher resolution image of step (b).

14. The method of claim 13, wherein step (a) generates detail line information of said input image I, and step (c) adds this line information to the interpolated, higher resolution image.

15. The method of claim 1, wherein the laplacian matrix L is a zero-sum filter kernel.

16. A method of enlarging an input image I, comprising:
providing said digital input image, I, in physical memory, said input image having color information in a native color space for each image pixel;
providing a processing device coupled to said physical memory to access said input image I and create an output image, h, by implementing the following steps:
(a) applying the following sequence to said input image I, $$h_{\sigma,\epsilon}(x) = \frac{\sum_{y\in\Omega_x} (f_s^{\sigma}(x,y)L_{xy}^{\epsilon}I(y))}{\sum_{y\in\Omega_x} (f_s^{\sigma}(x,y)L_{xy}^{\epsilon})}$$

where:
(i) x and y are pixel locations over an image grid;
(ii) $\Omega_x$ is the neighborhood induced around the central pixel x;
(iii) $f_s(x,y)$ measures the spatial affinity between pixels at x and y;
(iv) parameter $\sigma$ controls an amount of spatial blurring;
(v) $L_{xy}^{\epsilon}$ a laplacian matrix that provides positive color affinity value for two examined pixels, x and y, that have the same color and provides a zero color affinity value for pixels with different color;
(vi) parameter $\epsilon$ is a regularization term whose relative weight determines the smoothness of output image h;
(vii) laplacian matrix L is defined as a diagonal matrix, D, and a weight matrix, W, with the formulation L=D−W, where diagonal matrix D is further defined as $D_{ii}=\#[k|i\in w_k]$ at its diagonal, which represents the cardinality of the number of windows of which the pixel i is a member, individual terms of the weight matrix W are given by $$W_{ij} = \sum_{k|(i,j)\in w_k} \frac{1}{|w_k|}\left(1 + (I_i - \mu_k)\left(\sigma_k + \frac{\epsilon}{|w_k|}I_3\right)^{-1}(I_j - \mu_k)\right)$$

and weight matrix $W_{ij}$ is evaluated over all possible overlapping windows that contain the center pixel; and (b) interpolating said input image I to a resolution higher than its native resolution;

(c) combining the results of step (a) with the interpolated, higher resolution image of step (b).

17. The method of claim 16, wherein step (b) generates detail line information of said input image I, and step (c) adds this line information to the interpolated, higher resolution image.

18. The method of claim 16, wherein step (a) is applied to said input image I in its native color space.

19. The method of claim 17, wherein said native color space is the RGB color space.

20. A method of smoothing an input image I, comprising:
providing said digital input image, I, in physical memory, said input image having color information in a native color space for each image pixel;
providing a processing device coupled to said physical memory to access said input image I and create an output image, h, by implementing the following steps:
(a) applying the following sequence to said input image I, $$h_{\sigma,\varepsilon}(x) = \frac{\sum_{y \in \Omega_x} (f_s^\sigma(x,y) L_{xy}^\varepsilon I(y))}{\sum_{y \in \Omega_x} (f_s^\sigma(x,y) L_{xy}^\varepsilon)}$$

where:
(i) x and y are pixel locations over an image grid;
(ii) $\Omega_x$ is the neighborhood induced around the central pixel x;
(iii) $f_s(x,y)$ measures the spatial affinity between pixels at x and y;
(iv) parameter $\sigma$ controls an amount of spatial blurring;
(v) $L_{xy}^\varepsilon$ a laplacian matrix that provides positive color affinity value for two examined pixels, x and y, that have the same color and provides a zero color affinity value for pixels with different color;
(vi) parameter $\varepsilon$ is a regularization term whose relative weight determines the smoothness of output image h;
(vii) laplacian matrix L is defined as a diagonal matrix, D, and a weight matrix, W, with the formulation L=D−W, where diagonal matrix D is further defined as $D_{ii}$=#[k|i$\in$w$_k$] at its diagonal, which represents the cardinality of the number of windows of which the pixel i is a member, individual terms of the weight matrix W are given by $$W_{ij} = \sum_{k|(i,j)\in w_k} \frac{1}{|w_k|}\left(1 + (I_i - \mu_k)\left(\sigma_k + \frac{\varepsilon}{|w_k|}I_3\right)^{-1}(I_j - \mu_k)\right)$$

and terms of $W_{i,j}$ are evaluated by counting the contribution of only the center pixel's local window defined as the window centered about it.

21. The method of claim 20, wherein the local window w is a 3×3 pixel window.

22. The method of claim 20, wherein regularization factor of $\varepsilon$ is at last 0.1.

23. The method of claim 20, wherein step (a) is applied to said input image I in its native color space.

24. The method of claim 23, wherein said native color space is the RGB color space.

* * * * *